US010894860B2

(12) United States Patent
Isahaya et al.

(10) Patent No.: US 10,894,860 B2
(45) Date of Patent: Jan. 19, 2021

(54) HIGH MOLECULAR WEIGHT AROMATIC POLYCARBONATE RESIN MANUFACTURING METHOD

(71) Applicant: MITSUBISHI GAS CHEMICAL COMPANY, INC., Tokyo (JP)

(72) Inventors: Yoshinori Isahaya, Tokyo (JP); Atsushi Hirashima, Tokyo (JP); Hidefumi Harada, Tokyo (JP); Maki Ito, Tokyo (JP); Jun-ya Hayakawa, Tokyo (JP); Takehiko Isobe, Tokyo (JP); Yousuke Shinkai, Tokyo (JP); Keisuke Shimokawa, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 271 days.

(21) Appl. No.: 16/088,952

(22) PCT Filed: Mar. 24, 2017

(86) PCT No.: PCT/JP2017/011901
§ 371 (c)(1),
(2) Date: Sep. 27, 2018

(87) PCT Pub. No.: WO2017/170185
PCT Pub. Date: Oct. 5, 2017

(65) Prior Publication Data
US 2019/0119441 A1   Apr. 25, 2019

(30) Foreign Application Priority Data

Mar. 30, 2016 (JP) ................................. 2016-068722

(51) Int. Cl.
*C08G 64/06* (2006.01)
*C08G 64/30* (2006.01)
*C08G 64/16* (2006.01)

(52) U.S. Cl.
CPC .......... *C08G 64/06* (2013.01); *C08G 64/1608* (2013.01); *C08G 64/30* (2013.01); *C08G 64/305* (2013.01)

(58) Field of Classification Search
CPC ........ C08G 63/00; C08G 64/00; C08G 64/04; C08L 69/00; C08L 101/00; C08K 5/42
See application file for complete search history.

(56) References Cited

U.S. PATENT DOCUMENTS 8,445,624 B2 * 5/2013 Fuji ...................... C08G 64/30
528/196
2014/0206826 A1   7/2014 Isahaya et al.
(Continued)

FOREIGN PATENT DOCUMENTS

EP   2851385 A1   3/2015
EP   3070112 A1   9/2016
(Continued)

OTHER PUBLICATIONS

Supplemental European Search Report dated Oct. 18, 2019 in EP 17 77 4722.
(Continued)

*Primary Examiner* — Shane Fang
(74) *Attorney, Agent, or Firm* — Greenblum & Bernstein, P.L.C.

(57) ABSTRACT

A high molecular weight aromatic polycarbonate resin manufacturing method that can achieve good quality and sufficiently high molecular weight includes: a step in which a dialcohol compound expressed by general formula (1) and a catalyst are mixed to obtain a catalyst composition; a step in which the obtained catalyst composition is transferred to a prepolymer mixing tank via a transfer pipe; a step in which the transferred catalyst composition and an aromatic poly-
(Continued)

carbonate prepolymer are mixed in the prepolymer mixing tank, under a pressure that is greater than or equal to the vapor pressure of the dialcohol compound at the temperature of the prepolymer mixing tank and is less than or equal to 5 MPa, to obtain a prepolymer mixture; and a high molecular weight achievement step in which the obtained prepolymer mixture is heat-treated under reduced pressure conditions to obtain a high molecular weight aromatic polycarbonate resin.

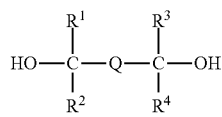

(1)

10 Claims, 2 Drawing Sheets

(56) References Cited

U.S. PATENT DOCUMENTS

| | | |
|---|---|---|
| 2014/0371404 A1 | 12/2014 | Isahaya et al. |
| 2015/0133611 A1 | 5/2015 | Isahaya et al. |
| 2015/0267006 A1 | 9/2015 | Isahaya et al. |
| 2015/0274887 A1 | 10/2015 | Isahaya et al. |
| 2016/0272757 A1 | 9/2016 | Isahaya et al. |

FOREIGN PATENT DOCUMENTS

| | | |
|---|---|---|
| JP | 2000-212270 | 8/2000 |
| JP | 2001-226478 | 8/2001 |
| JP | 2010-235940 | 10/2010 |
| JP | 2010-235941 | 10/2010 |
| JP | 2015-089905 A | 11/2015 |
| JP | 2015-189905 | 11/2015 |
| WO | 2012/157766 | 11/2012 |
| WO | 2013/100072 | 7/2013 |
| WO | 2013/172317 | 11/2013 |
| WO | 2014/077342 | 5/2014 |
| WO | 2014/077350 | 5/2014 |
| WO | 2015/072473 | 5/2015 |

OTHER PUBLICATIONS

U.S. Appl. No. 15/032,763 to Isahaya et al., which was filed Apr. 28, 2016.
U.S. Appl. No. 14/368,043 to Isahaya et al., which was filed Jun. 23, 2014.
U.S. Appl. No. 14/400,640 to Isahaya et al., which was filed Nov. 12, 2014.
U.S. Appl. No. 14/442,911 to Isahaya et al., which was filed May 14, 2015.
U.S. Appl. No. 14/441,939 to Isahaya et al., which was filed May 11, 2015.
U.S. Appl. No. 14/118,439 to Isahaya et al., which was filed Nov. 18, 2013.
International Search Report in International Patent Application No. PCT/JP2017/011901, dated Mar. 24, 2017.
International Preliminary Report on Patentability in International Patent Application No. PCT/JP2017/011901, dated Oct. 2, 2018.

* cited by examiner

HIGH MOLECULAR WEIGHT AROMATIC POLYCARBONATE RESIN MANUFACTURING METHOD

TECHNICAL FIELD

The present invention relates to a process for producing a high molecular weight aromatic polycarbonate resin.

BACKGROUND ART

Polycarbonate resins have widely been used in many fields because of their excellent heat resistance, impact resistance and transparency. Many studies have been made in the conventional methods for producing polycarbonate resins. For example, there is disclosed a process for producing a high molecular weight polycarbonate resin, which comprises the steps of reacting an aromatic polycarbonate prepolymer with an aliphatic diol compound (linking agent) having a specific structure in the presence of a transesterification catalyst to increase the molecular weight, and removing at least a part of the by-produced cyclic carbonate in the molecular weight increasing step out of the reaction system, and it is said that it is possible to maintain the good quality of the aromatic polycarbonate resin and achieve sufficiently high molecular weight (for example, see Patent Literature 1).

CITATION LIST

Patent Literature

Patent Literature 1: WO 2012/157766 A

SUMMARY OF INVENTION

Technical Problem

In general, in the process for producing a high molecular weight aromatic polycarbonate resin by the melting method, there are problems that an abrupt increase of the viscosity of the resin in the system as the polymerization progresses makes it difficult to efficiently remove a by-produced monohydroxy compound out of the system, whereby the polymerization rate is so lowered that it becomes difficult to attain sufficiently increased molecular weight or it takes a long time to increase the molecular weight. In addition, it is the present status that worsening in moldability (flowability), worsening in color hue (deterioration in appearance), etc., are generated due to a large amount of heterogeneous structures such as branching and crosslinking, etc., caused by long-term heat retention, etc., so that sometimes achievement of satisfactory quality is difficult.

Accordingly, an object of the present invention is to provide a process for producing a high molecular weight aromatic polycarbonate resin, which permits production of the resin with good quality and sufficiently high molecular weight.

Solution to Problem

The present inventors have intensively studied to solve the above-mentioned problems, and as a result, they have found that the above-mentioned problems can be solved by feeding a catalyst to be used for increasing the molecular weight with a specific feeding method in a production process comprising a reaction of increasing the molecular weight of an aromatic polycarbonate prepolymer (hereinafter also referred to as "molecular weight increasing linking reaction") by subjecting to the reaction of an aromatic polycarbonate prepolymer and a dialcohol compound in the presence of a transesterification catalyst, whereby accomplished the present invention. Specific measures for solving the above-mentioned problems are as follows, and the present invention encompasses the following aspects.

[1] A process for producing a high molecular weight aromatic polycarbonate resin which comprises the steps of:

mixing a dialcohol compound represented by formula (1) and a catalyst to obtain a catalyst composition, transferring the obtained catalyst composition to a prepolymer mixing tank through a transfer pipe, mixing the transferred catalyst composition and an aromatic polycarbonate prepolymer in the prepolymer mixing tank under a pressure of not lower than a vapor pressure of the dialcohol compound at a temperature of the prepolymer mixing tank and not higher than 5 MPa, to obtain a prepolymer mixture, and increasing a molecular weight of the prepolymer by subjecting the obtained prepolymer mixture to heat treatment under a reduced pressure to obtain a high molecular weight aromatic polycarbonate resin:

[Formula 1]

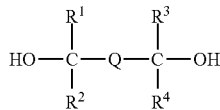

wherein, in formula (1), $R^1$ to $R^4$ each independently represent a hydrogen atom, a halogen atom or a linear or branched alkyl group having 1 to 5 carbon atoms; and Q represents a single bond or a substituted or unsubstituted divalent group comprising at least one member selected from the group consisting of an aliphatic group, an aromatic group, an oxygen atom, a sulfur atom, a sulfone group, a sulfoxide group, a carbonyl group, a dialkylsilyl group and a diarylsilyl group.

[2] The process of [1], wherein the catalyst composition is transferred to the prepolymer mixing tank in a temperature range of not lower than a temperature 5° C. above a melting point of the dialcohol compound and not higher than a temperature 250° C. above the melting point of the dialcohol compound.

[3] The process of [1] or [2], wherein the prepolymer mixture is obtained at a temperature not lower than a temperature at which the catalyst composition is transferred.

[4] The process of to any one of [1] to [3], wherein the prepolymer mixture is obtained at a temperature of not higher than a temperature 260° C. above the melting point of the dialcohol compound.

[5] The process of any one of [1] to [4], wherein the high molecular weight aromatic polycarbonate resin is obtained at a temperature of not lower than the temperature of the prepolymer mixing tank.

[6] The process of any one of [1] to [5], wherein the high molecular weight aromatic polycarbonate resin is obtained at a temperature of not higher than a temperature 80° C. above the temperature of the prepolymer mixing tank.

[7] The process of any one of [1] to [6], wherein the catalyst is at least one member selected from the group consisting of an alkali metal salt and an alkaline earth metal salt.

Advantageous Effects of Invention

According to the present invention, there can be provided a process for producing a high molecular weight aromatic polycarbonate resin, which permits production of the resin with good quality and sufficient high molecular weight.

DESCRIPTION OF EMBODIMENTS

Figure 1:
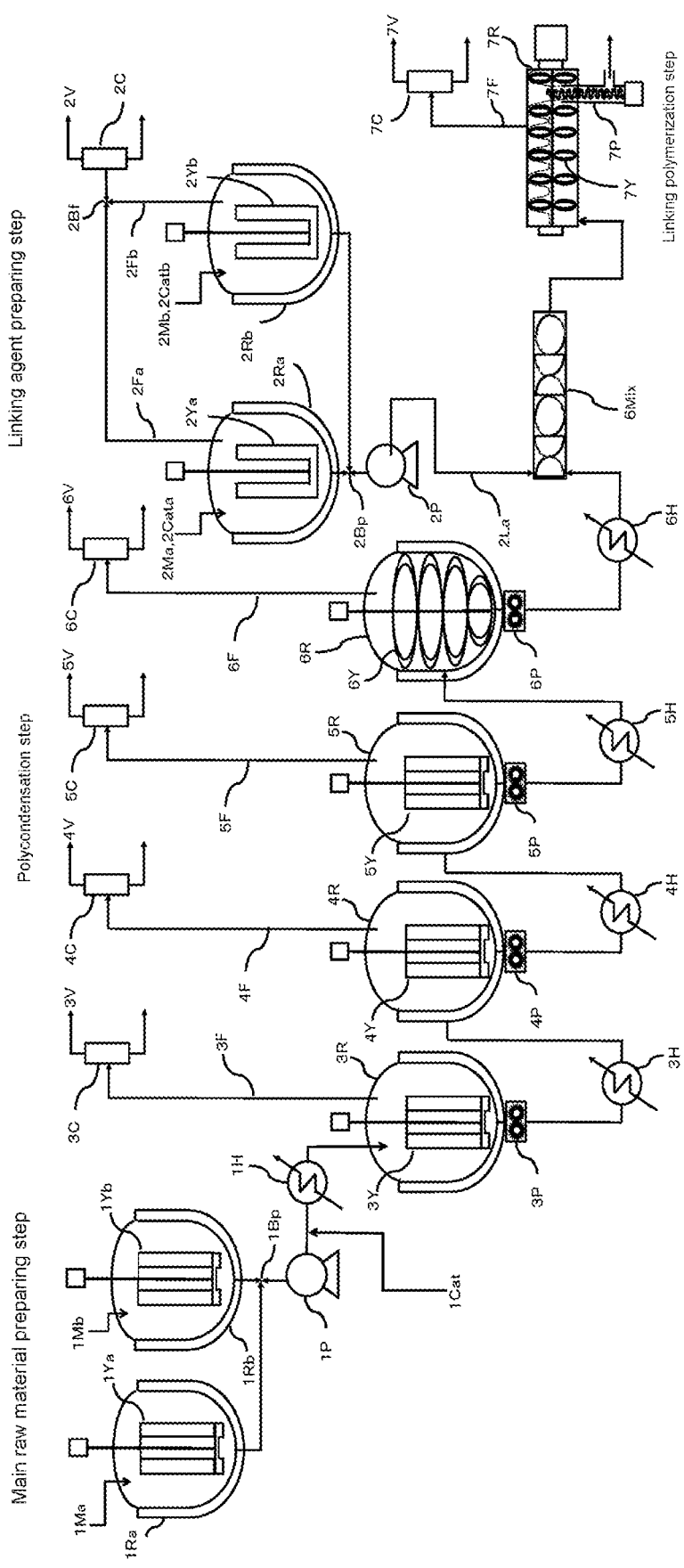
FIG. 1 is a schematic view showing one example of production apparatus to be used in the production process according to an embodiment of the invention.

In the present specification, the term "step" is understood not only to refer to an independent step but also to include an action by which the intended purpose of the step can be achieved even if the action cannot be clearly distinguished from other steps. Also, the numerical range indicated by using "to" refers to the range including the numerical values described before and after "to" as the minimum value and the maximum value, respectively. Further, when more than one substance is present for each of the components in the composition, the content of each of the components in the composition is understood to mean the total amount of the more than one substance present in the composition unless otherwise specifically mentioned.

<Production Process of High Molecular Weight Aromatic Polycarbonate Resin>

The production process of the high molecular weight aromatic polycarbonate resin of the present embodiment comprises:

the step (hereinafter also referred to as the "first step") of mixing a dialcohol compound represented by formula (1) and a catalyst to obtain a catalyst composition;

the step (hereinafter also referred to as the "second step") of transferring the obtained catalyst composition to a prepolymer mixing tank through a transfer pipe;

the step (hereinafter also referred to as the "third step") of mixing the transferred catalyst composition and an aromatic polycarbonate prepolymer (hereinafter also simply referred to as "the prepolymer") in the prepolymer mixing tank under a pressure of not lower than the vapor pressure of the dialcohol compound at the temperature of the prepolymer mixing tank and not higher than 5 MPa, to obtain a prepolymer mixture; and the step of increasing the molecular weight of the prepolymer (hereinafter also referred to as the "fourth step") by subjecting the obtained prepolymer mixture to heat treatment under a reduced pressure to obtain a high molecular weight aromatic polycarbonate resin.

[Formula 2]

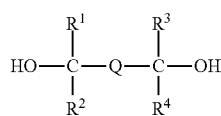

(1)

In formula (1), $R^1$ to $R^4$ each independently represent a hydrogen atom, a halogen atom or a linear or branched alkyl group having 1 to 5 carbon atoms. Q represents a single bond or a substituted or unsubstituted divalent group comprising at least one member selected from the group consisting of an aliphatic group, an aromatic group, an oxygen atom, a sulfur atom, a sulfone group, a sulfoxide group, a carbonyl group, a dialkylsilyl group and a diarylsilyl group.

In the production process of the present embodiment, a catalyst composition, which is a mixture of a catalyst and a dialcohol compound, is prepared, transferred to a prepolymer mixing tank through a transfer pipe, and then, a prepolymer mixture is prepared under a specific pressure condition, whereby it is possible to produce a high molecular weight aromatic polycarbonate resin, in which the molecular weight has been increased to a desired molecular weight efficiently and stably, while effectively suppressing coloration in the produced high molecular weight aromatic polycarbonate resin. Also, by increasing the molecular weight of the prepolymer using the catalyst composition, occurrence of a heterogeneous structure is further suppressed, whereby a high molecular weight aromatic polycarbonate resin, which has a low N value as a structural viscosity index and excellent in flowability, can be economically advantageously produced.

This can be considered, for example, as follows. When the mixing of the catalyst composition and the prepolymer is carried out under a pressure exceeding a predetermined pressure or under a pressure lower than a predetermined pressure, deterioration of the diol compound contained in the catalyst composition proceeds, and it can be considered that the deterioration induces coloring of the resulting high molecular weight aromatic polycarbonate, insufficient progress of the molecular weight increasing reaction by the dialcohol compound, and difficulty in attaining a desired molecular weight.

Further, feeding of a catalyst (hereinafter simply referred to as a "catalyst") for promoting the molecular weight increasing reaction to the aromatic polycarbonate prepolymer in the form of a catalyst composition obtained by mixing the catalyst with the dialcohol compound permits easy and stable feeding of the catalyst and the dialcohol compound as well as supply of the catalyst with excellent dispersibility. As a result, occurrence of heterogeneous structures is effectively suppressed and further occurrence of cleavage (split) reaction of the prepolymer main chain is effectively suppressed, so that the time required for the molecular weight increasing reaction can be shortened. In addition, it is possible to suppress local increase in the concentration of the catalyst within the prepolymer mixture, whereby occurrence of a heterogeneous structure in the prepolymer itself can be effectively suppressed. In addition, it is not necessary to dilute the catalyst with water, an organic solvent, etc., at the time of addition of the catalyst, therefore, it is possible to suppress the variation of the reaction conditions (for example, decrease of the degree of reduced pressure in the reactor), and to suppress occurrence of side reactions caused by components not contributing to the reaction. As the result, the molecular weight increasing reaction proceeds more efficiently, while suppressing occurrence of heterogeneous structures.

In the conventional melting method, the catalyst was sometimes added after being mixed with a solvent such as an organic solvent, etc., or an aromatic monohydroxyl compound (a phenol compound) which is a raw material of the prepolymer. However, in such a method, there were some cases which need a long time to increase the molecular weight, and the other cases in which the molecular weight has not sufficiently increased. In addition, when a catalyst is mixed with a prepolymer and used as a master batch, the master batch as prepared contains a high concentration of catalyst, which sometimes causes decrease of the molecular weight of the resultant polymer. In contrast, in this embodiment, by using a catalyst mixed with a dialcohol compound, the problem of undesirable lowering of the molecular weight of the resultant polymer as in the prior art can also be avoided.

The process for producing the high molecular weight aromatic polycarbonate resin may be a continuous process in which the first step, the second step, the third step and the fourth step are carried out continuously, or may be a batch process in which each of the steps is carried out independently, or may be a combination of such a continuous process and batch process in which at least two of the steps are carried out continuously.

First Step

In the first step, the dialcohol compound represented by formula (1) is mixed with a catalyst to obtain a catalyst composition. The obtained catalyst composition is preferably in a liquid state. By mixing the first catalyst in a catalyst composition together with the aromatic polycarbonate prepolymer, it is possible to uniformly distribute the first catalyst in the obtained prepolymer mixture. Here, being in a liquid state mean a state in which the catalyst composition has flowability and, for example, the viscosity is 1,000 Pa·s or less.

The dialcohol compound and the catalyst contained in the catalyst composition will be described in detail later.

In the step of obtaining the catalyst composition, the method of mixing the dialcohol compound and the catalyst is not particularly limited. The mixing method includes, for example, a method comprising mixing a dialcohol compound and a catalyst directly; and a method comprising dissolving or dispersing a catalyst in a solvent to prepare a catalyst solution or dispersion, and mixing the solution or dispersion with a dialcohol compound. Of these, the method comprising the step of mixing a dialcohol compound and a catalyst solution or dispersion is preferable.

The solvent used for preparation of the catalyst solution or dispersion is not particularly limited as long as it is a solvent capable of dissolving at least a part of the catalyst. Among them, the solvent is preferably such a solvent that is capable of being handled at normal temperature, has a low reactivity, and has an appropriate boiling point for being removed by devolatilization.

The usable solvent includes, for example, an organic solvent including an alcohol solvent such as methanol, ethanol, isopropyl alcohol, etc.; a ketone solvent such as acetone, methyl ethyl ketone, etc.; an ether solvent such as diethyl ether, diisopropyl ether, etc.; an aliphatic hydrocarbon solvent such as pentane, hexane, heptane, etc.; an aromatic hydrocarbon solvent such as benzene, toluene, xylene, etc.; a halogenated hydrocarbon solvent such as dichloromethane, chloroform, etc.; a phenol compound; water; and a mixture thereof.

It is preferable that the solvent contains a low content of metal components. More preferably, the solvent contains as metal components, for example, 10 ppm or less of alkali metal, 3 ppm or less of heavy metal iron, 2 ppm or less of nickel and 1 ppm or less of chromium. For example, when water is used as a solvent, it is preferable to use deionized water or distilled water.

The catalyst can be present in the catalyst solution or dispersion in an appropriately selected concentration, and it can be present in a concentration of, for example, 0.0005 mol/L to 0.05 mol/L, preferably 0.001 mol/L to 0.01 mol/L.

The step of obtaining the catalyst composition may be carried out at room temperature or under heating. When the step is carried out under heating, it can be carried out so that the obtained catalyst composition is within the temperature range of, for example, not lower than the melting point of the dialcohol compound, preferably not lower than the melting point and not higher than the temperature 80° C. above the melting point, and more preferably not lower than the melting point and not higher than the temperature 50° C. above the melting point.

The step of obtaining the catalyst composition may be carried out under atmospheric pressure, under a pressure higher than the atmospheric pressure or under a pressure lower than the atmospheric pressure.

The atmosphere in the step of obtaining the catalyst composition is not particularly limited, and it can be appropriately selected depending on the purpose, etc., from ordinarily applied atmosphere. The atmosphere in the first step may be any of from an air atmosphere to an inert gas atmosphere. From the viewpoints of achieving good quality such as color hue, etc., and intended molecular weight, the atmosphere has an oxygen concentration of preferably 10% by volume or less, more preferably 5% by volume or less. The inert gas includes a rare gas such as argon, nitrogen, etc.

It is preferable that the step of obtaining the catalyst composition further includes the step of dehydration treatment or devolatilization treatment to obtain a catalyst composition. By the dehydration treatment or devolatilization treatment, the catalyst composition is brought into a dry state in which the content of water, an organic solvent, etc., in the catalyst composition has been reduced, so that it encourages the molecular weight increasing reaction more efficiently. In addition, such a treatment provides formation of a more uniform catalyst composition, more stable supply thereof, and more stable production operation. As the results, a high molecular weight aromatic polycarbonate resin of higher quality can be produced with higher productivity.

The dehydration treatment or devolatilization treatment may be carried out at the time of mixing the dialcohol compound and the catalyst, or may be carried out after the mixing.

The dehydration treatment or devolatilization treatment is not particularly limited as long as it can remove at least a part of water and other volatile components other than the dialcohol compound and the catalyst contained in the catalyst composition, and can be carried out by appropriately selecting from the usually used dehydration or volatilization method.

The dehydration treatment or devolatilization treatment includes a method in which the catalyst composition is bringing into contact with a dehydrating agent, a method in which the catalyst composition is placed under reduced pressure, a method in which the catalyst composition is heated, and a method in which the catalyst composition is heated under reduced pressure. They may be conducted alone or in combination of two or more. Among them, as the dehydration treatment or devolatilization treatment, a method in which the catalyst composition is heated under reduced pressure is preferable.

As the dehydrating agent, any general dehydrating agent can be used. Specifically the dehydrating agent includes silica gel, calcium chloride, diphosphorus pentaoxide, molecular sieves, sodium sulfate, magnesium sulfate, etc. The degree of pressure reduction when the catalyst composition is placed under reduced pressure is, for example, 300 torr (40 kPa) or less, preferably 100 torr (13.3 kPa) or less, and more preferably 0.01 torr (1.3 Pa) to 100 torr (13.3 kPa). When the catalyst composition is heated, it is heated, for example, to a temperature not lower than the melting point of the dialcohol compound, preferably to a temperature not lower than the melting point of the dialcohol compound and not higher than 80° C. above the melting point of the dialcohol compound, more preferably to a temperature not lower than the melting point of the dialcohol compound and not higher than 50° C. above the melting point of the dialcohol compound; and the temperature can fall within the range of, for example, 50° C. to 120° C., preferably 60° C. to 90° C. The degree of pressure reduction and the temperature when the catalyst composition is heated under reduced pressure are, for example, a degree of pressure reduction not higher than 300 torr (40 kPa) and a temperature not lower than the melting point of the dialcohol compound, respectively; and preferably a degree of pressure reduction of 0.01 torr (1.3 Pa) to 100 torr (13.3 kPa) and a temperature not lower than the melting point of the dialcohol compound and not higher than 50° C. above the melting point of the dialcohol compound, respectively.

The duration of time for the dehydration treatment or devolatilization treatment can be appropriately selected depending on the treatment method, etc. The treatment time is, for example, 10 minutes to 70 minutes, and preferably 30 minutes to 60 minutes.

The water content of the catalyst composition is not particularly limited, and can be appropriately selected depending on the purpose, etc. The water content of the catalyst composition is, for example, 3% by mass or less, preferably 1% by mass or less, and more preferably 0.5% by mass or less. A water content of the catalyst composition of the predetermined amount or less would further improve the stability of the catalyst composition. In addition, it would provide an advantage of easier achievement of the targeted high molecular weight at a higher speed.

The apparatus available for carrying out the step of obtaining the catalyst composition (hereinafter also referred to as "catalyst composition preparation tank"), for example, includes a catalyst composition preparation tank, which is a stirring tank equipped with a stirring means and a heating means. The stirring means is not particularly limited, and can be appropriately selected from general stirring apparatuses. The usable stirring means includes, for example, general stirring blades such as anchor blade, and paddle blade. It is also preferable that the catalyst composition preparation tank further comprises a pressure reducing means.

The material of the catalyst composition preparation tank is not particularly limited, and may be appropriately selected according to the purpose, etc., from materials usually used, such as metal materials and glass materials. From the viewpoint of quality such as color hue of the resulting resin, the material of the surface of the catalyst composition preparation tank in contact with the catalyst composition is preferably at least one member selected from the group consisting of (a) a metal material having an iron content of 80% by mass or less and a Cr content of 18% by mass or more; stainless steel such as SUS304, SUS316, SUS316L, SUS310S, etc., and a metal material that is a clad material, and (b) a glass material.

In the case where the material of the catalyst composition preparation tank is a metal material, a stainless steel having an iron content of 80% by mass or less and a Cr content of 18% by mass or more is preferable. Specifically, the stainless steel includes austenitic stainless steel. More specifically, it includes SUS304, SUS304L, SUS316, SUS316L, SUS309S, SUS310S, SUS317 and SUS317L, and at least one member selected from the group consisting of these is preferable.

In the case where the material of the catalyst composition preparation tank is glass, the glass preferably has an elution amount of alkali metal of 15 ppb/cm$^2$ or less when immersed in pure water at 50° C. for 120 hours.

The number of the catalyst composition preparation tank is not particularly limited, and a plurality of catalyst composition preparation tanks can be used, if necessary. In the case where a plurality of the catalyst composition preparation tanks are used, the step of obtaining the catalyst composition is independently carried out in each of the catalyst composition preparation tanks, and the catalyst composition prepared in each of the catalyst composition preparation tanks is preferably transferred to the prepolymer mixing tank sequentially. That is, in a preferred embodiment, a catalyst composition prepared in a catalyst composition preparation tank is transferred to the prepolymer mixing tank, and subsequently another catalyst composition prepared in another catalyst composition preparation tank is transferred to the prepolymer mixing tank. In this case, transfer pipes connected to each of the catalyst composition preparation tanks may be independently connected to the prepolymer mixing tank; or alternatively, each of the catalyst composition preparation tanks may be connected to a single switchable transfer pipe connected to the prepolymer mixing tank through a switching valve.

The catalyst composition preparation tank may have at least one catalyst composition extraction port provided with a valve from which the prepared catalyst composition is taken out. The position at which the catalyst composition extraction port is located is not particularly limited, and can be appropriately selected depending on the configuration of the production apparatus, etc. The catalyst composition extraction port is preferably disposed, for example, at a position lower than the liquid level at the time of steady operation. When the catalyst composition preparation tank has such a catalyst composition extraction port, the catalyst composition extraction port is connected to the transfer pipe. The catalyst composition extraction port and the transfer pipe are connected, for example, through a flange.

If the catalyst composition obtained in the first step is not immediately transferred to the prepolymer mixing tank, it is preferable to retain the catalyst composition in a liquid state. The catalyst composition may be retained, for example, in a catalyst composition preparation tank or in a storage tank other than the catalyst composition preparation tank.

When catalyst compositions are prepared using each of a plurality of catalyst composition preparation tanks, for example, while a catalyst composition prepared in one catalyst composition preparation tank is consumed to prepare a prepolymer mixture, another catalyst composition prepared in another catalyst composition preparation tank is stored in a liquid state so as to facilitate continuous preparation of the prepolymer mixture, whereby production efficiency can be more improved.

The liquid state of the catalyst composition can be maintained, for example, by heating the catalyst composition. A heating temperature is not particularly limited as long as the liquid state can be maintained and, for example, it is preferably within a temperature range of not lower than the temperature 5° C. above the melting point of the dialcohol compound and not higher than the temperature 250° C. above the melting point; more preferably a temperature range of not lower than the temperature 5° C. above the melting point of the dialcohol compound and not higher than the temperature 80° C. above the melting point; and further preferably a temperature range of not lower than the temperature 5° C. above the melting point and not higher than the temperature 50° C. above the melting point.

The viscosity of the catalyst composition retained in a liquid state is not particularly limited. The viscosity of the catalyst composition maintained in a liquid state is, for example, preferably 0.1 P to 10,000 P (poise; 0.01 Pa·s to 1,000 Pa·s), and more preferably 1 P to 100 P (0.1 Pa·s to 10 Pa·s).

The pressure at which the catalyst composition is retained is not particularly limited, and may be normal pressure, higher pressure than normal pressure, or lower pressure than normal pressure. The catalyst composition is preferably retained under a substantially constant pressure, and more preferably it is retained under a pressure within a variation range of ±10%. Retaining the catalyst composition under a substantially constant pressure facilitates, for example, keeping the feeding amount of the catalyst composition steadily at the time when it is mixed with the prepolymer. According to this, a variation in quality of the resulting prepolymer mixture can be effectively suppressed.

The liquid state catalyst composition is transferred to the prepolymer mixing tank and mixed with the prepolymer preferably within 10 hours, more preferably 9 hours after being prepared. Here, the starting point of the time until the catalyst composition and the prepolymer are mixed is a point of time at which a desired amount of the catalyst composition is obtained, and when the step of obtaining the catalyst composition contains the dehydration treatment or devolatilization treatment, it is made the point of time at which the treatment is completed. Also, the end point is the point of time at which the prepared catalyst composition is transferred to the prepolymer mixing tank and first contacted with the prepolymer. The time required for the catalyst composition to be transferred to the prepolymer mixing tank through the transfer pipe is included in the time until the catalyst composition and the prepolymer are mixed.

The method of mixing the dialcohol compound and the catalyst in the first step is not particularly limited. For example, after feeding a predetermined amount of the dialcohol compound to the catalyst composition preparation tank, a predetermined amount of the catalyst may be fed to the catalyst composition preparation tank and mixed. Conversely, after feeding a predetermined amount of the catalyst to the catalyst composition preparation tank, a predetermined amount of the dialcohol compound may be fed to the catalyst composition preparation tank and mixed. The dialcohol compound and the catalyst may be fed alternately to the catalyst composition preparation tank and mixed, or the dialcohol compound and the catalyst may be simultaneously fed to the catalyst composition preparation tank and mixed.

When feeding the dialcohol compound or the catalyst composition to the catalyst composition preparation tank, a filtration apparatus may be used.

In the case of using a plurality of catalyst composition preparation tanks, for example, after preparation of the catalyst composition is started in one catalyst composition preparation tank, before the amount of the catalyst composition prepared in the catalyst composition preparation tank reaches the amount of ⅔ based on the amount of the catalyst composition at the time of finishing the preparation, preparation of another catalyst composition preparation can be started in another catalyst composition preparation tank. By preparing the catalyst composition in a time overlapping manner using a plurality of catalyst composition preparation tanks, a high molecular weight aromatic polycarbonate can be produced more efficiently.

A method of feeding the dialcohol compound and the catalyst to the catalyst composition preparation tank is not particularly limited. For example, each of the dialcohol compound and the catalyst (preferably the catalyst solution or dispersion) is quantitatively fed to the catalyst composition preparation tank from a hopper equipped with a pressure release pipe through a fixed quantity feeding apparatus. A feeding pipe may be arranged between the fixed quantity feeding apparatus and the catalyst composition preparation tank. Further, the hopper and the catalyst composition preparation tank may be connected by a pressure equalizing pipe, and in such a case, the pressure release pipe may have an inner diameter of ⅙ to ½ that of the inner diameter of the feeding pipe, and the pressure equalizing pipe may have an inner diameter of ⅕ to ½ that of the inner diameter of the feeding pipe. The amounts of the dialcohol compound and the catalyst retained in the hopper are not particularly limited and they can be made, for example, 30% by volume to 90% by volume of the effective volume of the hopper, respectively.

The content ratio of the dialcohol compound and the catalyst in the catalyst composition is not particularly limited, and it can be appropriately selected depending on the type of the catalyst, etc. The content ratio of the catalyst to the dialcohol compound (the catalyst/the dialcohol compound, % by mass) ranges, for example, 0.0001% by mass to 0.1% by mass, preferably 0.0005% by mass to 0.01% by mass, more preferably 0.0005% by mass to 0.007% by mass, and particularly preferably 0.001% by mass to 0.005% by mass.

The catalyst composition may contain other components except for the dialcohol compound and the catalyst. The other components include water, an organic solvent, a phenol compound, etc.

The content of the other components except for the dialcohol compound and the catalyst contained in the catalyst composition is preferably 3% by mass or less, more preferably 1% by mass or less, further preferably 0.3% by mass or less, and particularly preferably 0.03% by mass or less in the catalyst composition.

The content of water in the catalyst composition can be measured by, for example, the Karl Fischer method. In addition, the contents of an organic solvent, a phenol compound, etc., in the catalyst composition can be measured, for example, by gas chromatography.

The dialcohol compound contained in the catalyst composition refers to a compound having two alcoholic hydroxyl groups each bonded to a nonaromatic carbon atom. The dialcohol compound may have a substructure containing an aromatic ring in the molecule, but a phenol compound having a hydroxyl group bonded to an aromatic ring is not embraced within the dialcohol compound.

The dialcohol compound used in the production process of the present embodiment is represented by formula (1).

[Formula 3]

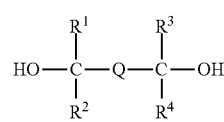

(1)

In formula (1), $R^1$ to $R^4$ each independently represent a hydrogen atom, a halogen atom or a linear or branched alkyl group having 1 to 5 carbon atoms. From the viewpoint of the reaction efficiency of the molecular weight increasing reaction, it is preferable that each of $R^1$ to $R^4$ independently represents a hydrogen atom, a fluorine atom, a chlorine atom or an alkyl group having 1 to 3 carbon atoms, more preferably a hydrogen atom, a fluorine atom or a methyl group, and still more preferably a hydrogen atom.

Also, in $R^1$ to $R^4$, it is also preferable that at least one of $R^1$ and $R^2$ and at least one of $R^3$ and $R^4$ are hydrogen atoms, and it is more preferable that all of $R^1$ to $R^4$ are hydrogen atoms. That is, the dialcohol compound represented by formula (1) is preferably a secondary dialcohol compound or a primary dialcohol compound, and more preferably a primary dialcohol compound.

Q represents a single bond or a substituted or unsubstituted divalent group comprising at least one member selected from the group consisting of an aliphatic group, an aromatic group, an oxygen atom, a sulfur atom, a sulfone group, a sulfoxide group, a carbonyl group, a dialkylsilyl group and a diarylsilyl group.

The aliphatic group represented by Q includes a divalent group derived from a linear or branched alkane having 1 to 20 carbon atoms, a divalent group derived from a linear or branched alkene having 1 to 20 carbon atoms, a group derived from a cycloalkane or cycloalkene each having 3 to 30 carbon atoms, etc. Here, the divalent group derived from an alkane, etc., means a group formed by removing two hydrogen atoms from the alkane, etc., and the position where the hydrogen atom is removed is not particularly limited. The cycloalkane and the cycloalkene may be a bridged ring such as a bicycloalkane, a tricycloalkane, etc., a condensed ring with another aliphatic ring, aromatic ring, etc., or a polycyclic ring assembly. When the aliphatic group contains a cyclic structure, it may be an aliphatic heterocyclic group in which at least one carbon atom constituting the ring is replaced by a hetero atom such as an oxygen atom, a nitrogen atom, a sulfur atom, etc.

Specific examples of the aliphatic group containing a cyclic structure include cyclohexanediyl, decalindiyl, octahydroindenediyl, adamanthanediyl, oxacyclohexanediyl, dioxacyclohexanediyl, etc.

The aromatic group represented by Q includes a divalent aromatic group having 6 to 40 carbon atoms. The aromatic group may be a heteroaromatic group in which at least one carbon atom is replaced by a hetero atom such as an oxygen atom, a nitrogen atom, a sulfur atom, etc.

Specific examples of the aromatic group include phenylene, naphthalenediyl, benzofurandiyl, etc.

Q may be a divalent group constituted by combining at least two members selected from the group consisting of an aliphatic group, an aromatic group, an oxygen atom, a sulfur atom, a sulfone group, a sulfoxide group, a carbonyl group, a dialkylsilyl group and a diarylsilyl group. The group formed by the combination includes a linear divalent group such as an alkyleneoxyalkyl group, an alkylenesulfonylalkyl group, a biphenylene group, a polyarylene group, a polycarbonate group (for example, it contains an alkylene group, a cycloalkylene group, an alkylene cycloalkylene alkylene group, an alkylene arylene alkylene group, etc., as a substructure), an alkyleneoxy aryleneoxy alkylene group, etc., and a divalent group containing a cyclic structure such as an oxacycloalkylene group, a dioxacycloalkylene group, a dioxacycloalkylidene group, a fluorenylidene group, etc.

Q may have a substituent or substituents. The substituent includes an alkyl group having 1 to 12 carbon atoms, an alkoxy group having 1 to 10 carbon atoms, an aryl group having 6 to 10 carbon atoms, an aryloxy group having 6 to 10 carbon atoms, a halogen atom such as a fluorine atom, a chlorine atom, etc. When Q has a substituent or substituents, the number of the substituent is not particularly limited as long as it is substitutable.

The dialcohol compound represented by formula (1) includes a 2-hydroxyethoxy group-containing compound, a hydroxyalkyl group-containing compound, a carbonate diol compound, etc.

The dialcohol compound represented by formula (1) is preferably represented by formula (1a).

[Formula 4]

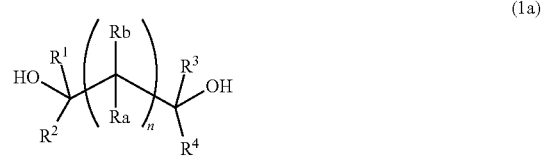

(1a)

In formula (1a), Ra and Rb each independently represent a hydrogen atom, a halogen atom, a linear or branched alkyl group having 1 to 30 carbon atoms which may contain one or more oxygen or halogen atoms, a cycloalkyl group having 3 to 30 carbon atoms which may contain one or more oxygen or halogen atoms, an aryl group having 6 to 30 carbon atoms which may contain one or more oxygen or halogen atoms, or an alkoxy group having 1 to 15 carbon atoms which may contain one or more oxygen or halogen atoms, or Ra and Rb may be bonded to each other to form a ring. The halogen atom is preferably a fluorine atom.

$R^1$ to $R^4$ each independently represent a hydrogen atom, a halogen atom or a linear or branched alkyl group having 1 to 5 carbon atoms. The halogen atom is preferably a fluorine atom.

n represents an integer of 0 to 30, preferably 1 to 6, more preferably 1 to 3, and particularly preferably 1.

In formula (1a), Ra and Rb are preferably each independently a hydrogen atom, a halogen atom, a linear or branched alkyl group having 1 to 8 carbon atoms, a cycloalkyl group having 3 to 8 carbon atoms, an aryl group having 6 to 10 carbon atoms or an alkoxy group having 1 to 8 carbon atoms, or Ra and Rb may be bonded to each other to form an alicyclic ring having 3 to 8 carbon atoms. The halogen atom is preferably a fluorine atom.

$R^1$ to $R^4$ preferably and each independently represents a hydrogen atom, a fluorine atom or a methyl group.

n is preferably an integer of 1 to 6.

In formula (1a), Ra and Rb are more preferably each independently a hydrogen atom or a linear or branched alkyl group having 1 to 5 carbon atoms, further preferably a linear or branched alkyl group having 1 to 4 carbon atoms. Preferable specific examples include a methyl group, an ethyl group, a propyl group, an n-butyl group, an isobutyl group, an isopentyl group, etc., and more preferable specific examples include a methyl group, an ethyl group, a propyl group, an n-butyl group and an isobutyl group. $R^1$ to $R^4$ are more preferably each independently a hydrogen atom. n more preferably represents an integer of 1 to 3.

The dialcohol compound represented by formula (1) is more preferably a compound represented by formula (1b). In formula (1b), Ra and Rb are the same as Ra and Rb in formula (1a), respectively.

[Formula 5]

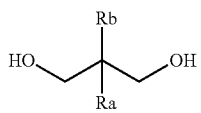

(1b)

In formula (1b), Ra and Rb are more preferably each independently a hydrogen atom or a linear or branched alkyl group having 1 to 5 carbon atoms, still more preferably a linear or branched alkyl group having 1 to 4 carbon atoms, further preferably a linear or branched alkyl group having 2 to 4 carbon atoms. Preferred specific examples thereof include a methyl group, an ethyl group, a propyl group, an n-butyl group, an isobutyl group, an isopentyl group, etc., more preferably an ethyl group, a propyl group, an n-butyl group and an isobutyl group.

More specific examples of the dialcohol compound include a dialcohol containing a cyclic structure such as 1,4-cyclohexanediol, 1,4-cyclohexanedimethanol, 1,6-cyclohexanedimethanol, tricyclo[5.2.1.0$^{2,6}$]decanedimethanol, decalin-2,6-dimethanol, pentacyclopentadecanedimethanol, isosorbide, isomannide, 1,3-adamanthanedimethanol, etc.; a dialcohol containing an aromatic ring such as p-xylylene glycol, m-xylylene glycol, naphthalenedimethanol, biphenyldimethanol, 1,4-bis(2-hydroxyethoxy)phenyl, 4,4'-bis(2-hydroxyethoxy)biphenyl, 2,2'-bis[(2-hydroxyethoxy)phenyl]propane, 9,9-bis[4-(2-hydroxyethoxy)phenyl]fluorene (BPEF), 9,9-bis(hydroxymethyl)fluorene, 9,9-bis(hydroxyethyl)fluorene, fluorene glycol, fluorene dimethanol, etc.; an aliphatic polyester diol such as polycaprolactonediol, poly(1,4-butanedioladipate)diol, poly(1,4-butanediolsuccinate) diol, etc.; a branched aliphatic dialcohol such as 2-butyl-2-ethylpropane-1,3-diol (2-butyl-2-ethyl-1,3-propane glycol; BEPG), 2,2-diethylpropane-1,3-diol, 2,2-diisobutylpropane-1,3-diol, 2,2-diisoamylpropane-1,3-diol, 2-ethyl-2-methylpropane-1,3-diol, 2-methyl-2-propylpropane-1,3-diol, 2-methylpropane-1,3-diol, propane-1,3-diol, propane-1,2-diol, etc.; a carbonatediol-based compound such as bis(3-hydroxy-2,2-dimethylpropyl)carbonate, etc. At least one member selected from the group consisting of these is preferable. More preferred is at least one member selected from the group consisting of pentacyclopentadecanedimethanol, 1,4-cyclohexanedimethanol, 1,3-adamanthanedimethanol, decalin-2,6-dimethanol, tricyclo[5.2.1.0$^{2,6}$]decanedimethanol, 2-butyl-2-ethylpropane-1,3-diol, 2,2-diisobutylpropane-1,3-diol, 2-ethyl-2-methylpropane-1,3-diol, 2,2-diethylpropane-1,3-diol, 2-methyl-2-propylpropane-1,3-diol, propane-1,3-diol, 2,2-diisoamylpropane-1,3-diol and 2-methylpropane-1,3-diol. Further preferred is at least one member selected from the group consisting of 2-butyl-2-ethylpropane-1,3-diol, 2,2-diisobutylpropane-1,3-diol, 2-ethyl-2-methylpropane-1,3-diol, 2,2-diethylpropane-1,3-diol, 2-methyl-2-propylpropane-1,3-diol, propane-1,3-diol, 2,2-diisoamylpropane-1,3-diol and 2-methylpropane-1,3-diol.

The dialcohol compound may be used alone or in combination of two or more. Suitable species of the dialcohol compound actually used may vary depending on the reaction conditions, etc., and can be appropriately selected depending on the reaction conditions employed, etc.

The upper limit of the boiling point of the dialcohol compound is not particularly limited. For example, the upper limit of the boiling point is 500° C. or lower. According to the method of the present embodiment, even with a dialkyl alcohol compound having a relatively low boiling point, it is possible to let the compound efficiently contribute to the molecular weight increasing reaction. Accordingly, the dialcohol compound is further preferably one having a relatively low boiling point of 350° C. or lower.

The lower limit of the boiling point of the dialcohol compound is not particularly limited. In view of the fact that the aromatic monohydroxyl compound by-produced by the reaction between the aromatic polycarbonate prepolymer and the dialcohol compound is to be distilled off, it is preferable that the dialcohol compound has a higher boiling point than the aromatic monohydroxyl compound. In addition, the lower limit of the boiling point of the dialcohol compound is preferably selected while considering the fact that the reaction is required to reliably proceed without volatilization under a constant temperature and pressure.

The dialcohol compound preferably has high purity, and preferably has a purity of 99% by mass or more. The impurities contained in the dialcohol compound include, for example, 2-ethyl-1-hexanol, etc., in case the dialcohol compound is 2-butyl-2-ethylpropane-1,3-diol.

In addition, the amount of metals contained in the dialcohol compound as impurities is preferably as little as possible. The metals contained as impurities include iron, etc. The amount of metals contained in the dialcohol compound is, for example, 5 ppm or less, and preferably 1 ppm or less.

The amount of the dialcohol compound to be used ranges preferably 0.01 mol to 1.0 mol, more preferably 0.1 mol to 1.0 mol, further preferably 0.1 mol to 0.5 mol, and particularly preferably 0.2 mol to 0.4 mol based on 1 mol of the amount of the total terminal group of the aromatic polycarbonate prepolymer.

Use of the dialcohol compound in an amount of the above-mentioned upper limit value or less would suppress occurrence of an insertion reaction in which the dialcohol compound is inserted as a copolymerization component into the main chain of the aromatic polycarbonate resin, and it tends to suppress the influence on the physical properties caused by the increase in copolymerization rate. On the other hand, although raising the ratio of copolymerization exceeding the upper limit value would permit improving the physical properties due to the use of the dialcohol compound, this is not preferable as an effect of increasing the molecular weight of the aromatic polycarbonate resin. In addition, use of the dialcohol compound in an amount not lower than the above-mentioned lower limit is preferable, because the effect of increasing the molecular weight is more enhanced.

The catalyst contained in the catalyst composition is not particularly limited as long as it can promote the molecular weight increasing reaction between the aromatic polycarbonate prepolymer and the dialcohol compound. For example, such a transesterification catalyst as a basic compound catalyst usually used for producing a polycarbonate can be used as the catalyst.

The basic compound catalyst includes an alkali metal compound and/or an alkaline earth metal compound, a nitrogen-containing compound, etc.

The alkali metal compound and/or the alkaline earth metal compound includes an organic acid salt, an inorganic salt, an oxide, a hydroxide, a hydride, an alkoxide and a phenoxide of an alkali metal and an alkaline earth metal. The nitrogen-containing compound includes a quaternary ammonium hydroxide and a salt thereof, an amine, etc. These compounds can be used alone or in combination of two or more.

Specific examples of the alkali metal compound include sodium hydroxide, potassium hydroxide, cesium hydroxide, lithium hydroxide, sodium hydrogencarbonate, sodium carbonate, potassium carbonate, cesium carbonate, lithium carbonate, sodium acetate, potassium acetate, cesium acetate, lithium acetate, lithium stearate, sodium stearate, potassium stearate, cesium stearate, lithium stearate, sodium borohydride, phenylated sodium borate, sodium tetraphenylboron, sodium benzoate, potassium benzoate, cesium benzoate, lithium benzoate, disodium hydrogenphosphate, dipotassium hydrogenphosphate, dilithium hydrogenphosphate, disodium phenylphosphate; disodium salt, dipotassium salt, dicesium salt and dilithium salt of bisphenol A; sodium salt, potassium salt, cesium salt and lithium salt of phenol, etc.

Specific examples of the alkaline earth metal compound include magnesium hydroxide, calcium hydroxide, strontium hydroxide, barium hydroxide, magnesium hydrogencarbonate, calcium hydrogencarbonate, strontium hydrogencarbonate, barium hydrogencarbonate, magnesium carbonate, calcium carbonate, strontium carbonate, barium carbonate, magnesium acetate, calcium acetate, strontium acetate, barium acetate, magnesium stearate, calcium stearate, calcium benzoate, magnesium phenyl phosphate, etc.

Specific examples of the nitrogen-containing compound include a quaternary ammonium hydroxide having an alkyl group and/or an aryl group, etc., such as tetramethylammonium hydroxide, tetraethylammonium hydroxide, tetrapropylammonium hydroxide, tetrabutylammonium hydroxide, trimethylbenzylammonium hydroxide, etc.; a tertiary amine such as triethylamine, dimethylbenzylamine, triphenylamine, etc.; a secondary amine such as diethylamine, dibutylamine, etc.; a primary amine such as propylamine, butylamine, etc.; an imidazole such as 2-methylimidazole, 2-phenylimidazole, benzimidazole, etc.; or, a base or a basic salt such as ammonia, tetramethylammonium borohydride, tetrabutylammonium borohydride, tetrabutylammoniumtetraphenylborate, tetraphenylammoniumtetraphenylborate, etc.

As other catalysts except for those mentioned above, a metal salt of zinc, tin, zirconium, lead, etc., is preferably used, and these may be used alone or in combination of two or more.

The other catalysts specifically include zinc acetate, zinc benzoate, zinc 2-ethylhexanoate, tin(II) chloride, tin(IV) chloride, tin(II) acetate, tin(IV) acetate, dibutyltin dilaurate, dibutyltin oxide, dibutyltin dimethoxide, zirconium acetylacetonate, zirconium oxyacetate, zirconium tetrabutoxide, lead(II) acetate, lead(IV) acetate, etc.

In the production process of the present embodiment, as the alkali metal compound and/or the alkaline earth metal compound, it is preferable to use at least one member selected from the group consisting of cesium carbonate ($Cs_2CO_3$), sodium hydrogencarbonate ($NaHCO_3$), sodium tetraphenylborate, disodium phenylphosphate and potassium carbonate. Of these, at least one of cesium carbonate and potassium carbonate is more preferable. These catalysts can be used alone or in combination.

These catalysts are used in a ratio of, for example, $1 \times 10^{-6}$ mol or less, preferably $1 \times 10^{-8}$ mol to $1 \times 10^{-6}$ mol, more preferably $1 \times 10^{-7}$ mol to $1 \times 10^{-6}$ mol based on 1 mol of the total of the aromatic dihydroxy compound constituting the aromatic polycarbonate prepolymer.

Also, as the nitrogen-containing compound catalyst, tetramethylammonium hydroxide is preferably used. The nitrogen-containing compound catalyst can be used alone or in combination with the above-mentioned alkali metal and/or alkaline earth metal, etc. These nitrogen-containing compound catalysts are used in a ratio of $1 \times 10^{-3}$ mol or less, preferably $1 \times 10^{-7}$ mol to $1 \times 10^{-3}$ mol, more preferably $1 \times 10^{-6}$ mol to $1 \times 10^{-4}$ mol based on 1 mol of the total of the aromatic dihydroxy compound.

The catalyst composition obtained in the first step preferably contains at least one dialcohol compound, and at least one catalyst selected from the group consisting of the alkali metal compound and the alkaline earth metal compound; and more preferably contains a dialcohol compound represented by formula (1b), and at least one catalyst selected from the group consisting of alkali metal compounds.

When the catalyst composition contains a dialcohol compound and at least one catalyst selected from the group consisting of an alkali metal compound and an alkaline earth metal compound, the content of the catalyst ranges, for example, 0.0001% by mass to 0.1% by mass, preferably 0.0005% by mass to 0.01% by mass, more preferably 0.0005% by mass to 0.007% by mass, and further preferably 0.001% by mass to 0.005% by mass.

Second Step

In the second step, the catalyst composition obtained in the first step is transferred to the prepolymer mixing tank through a transfer pipe. A transfer time required for transferring the catalyst composition is not particularly limited and can be made, for example, 10 hours or shorter. The time for transfer is preferably 3 hours or shorter, more preferably 1 hour or shorter, from the viewpoints of achieving better quality such as color hue, etc., and a desired molecular weight within a shorter period of time. Here, the time for transfer is calculated taking the point of time when the catalyst composition is introduced into the transfer pipe as the starting point, and taking the point of time when the catalyst composition is introduced into the prepolymer mixing tank from the transfer pipe as the end point.

In the second step, the catalyst composition stays in the transfer pipe until it is charged into the prepolymer mixing tank. Preferably, the catalyst composition stayed in the transfer pipe is maintained in liquid state.

The liquid state of the catalyst composition can be maintained, for example, by heating the catalyst composition. A heating temperature is not particularly limited as long as the liquid state can be maintained and, for example, it preferably falls within the range of not lower than a temperature 5° C. above the melting point of the dialcohol compound and not higher than a temperature 250° C. a above the melting point of the dialcohol compound; more preferably within the temperature range of not lower than a temperature 5° C. above the melting point of the dialcohol compound and not higher than a temperature 80° C. above the melting point of the dialcohol compound; and further preferably within the temperature range of not lower than a temperature 5° C. above the melting point of the dialcohol compound and not higher than the temperature 50° C. above the melting point of the dialcohol compound.

The viscosity of the liquid state catalyst composition is not particularly limited. The viscosity of the liquid state catalyst composition ranges, for example, preferably 0.1 P to 10,000 P (poise; 0.01 Pa·s to 1,000 Pa·s), more preferably 1 P to 100 P (0.1 Pa·s to 10 Pa·s).

The pressure in the transfer pipe is not particularly limited. It may be normal pressure, a higher pressure than normal pressure or a lower pressure than normal pressure. The catalyst composition is preferably kept under a substantially constant pressure, and more preferably it is kept under a pressure within a variation range of ±10%. Keeping the catalyst composition under a substantially constant pressure permits, for example, stably maintaining the feed amount of the catalyst composition at the time of mixing with the prepolymer. This makes it possible to effectively suppress variation in the quality of the obtained prepolymer mixture.

The atmosphere in the transfer pipe is not particularly limited. It can be appropriately selected depending on the purpose, etc., from ordinarily applied atmosphere. The atmosphere in the transfer pipe may be anywhere from an air atmosphere to an inert gas atmosphere. From the viewpoint of achieving good quality such as color hue, etc., and desired molecular weight, the atmosphere in the transfer pipe preferably has an oxygen concentration of 10% by volume or less, and more preferably 5% by volume or less.

The material of the transfer pipe is not particularly limited. It may be appropriately selected according to the purpose, etc., from the materials usually used. The material of the surface of the transfer pipe on which the catalyst composition is in contact is preferably stainless steel having an iron content of 80% by mass or less and a Cr content of 18% by mass or more from the viewpoint of quality such as color hue, etc., of the obtained resin. Specifically, it includes austenitic stainless steel, etc., more specifically, SUS304, SUS304L, SUS316, SUS316L, SUS309S, SUS310S, SUS317, SUS317L, etc., and at least one member selected from the group consisting of these is preferable.

The shape of the cross-sectional surface of the transfer pipe is not particularly limited. It may be made, for example, substantially circular.

The length and inner diameter of the transfer pipe connecting the catalyst composition preparation tank and the prepolymer mixing tank are not particularly limited. They can be appropriately selected depending on the purpose, etc. The length of the transfer pipe can be made, for example, 50 m or shorter, preferably 30 m or shorter, and more preferably 20 m or shorter. The lower limit of the length is not particularly limited and, for example, the length is 5 m or longer. The inner diameter of the transfer pipe is, for example, 0.5 mm or more, and preferably 1 mm or more. The upper limit of the inner diameter is not particularly limited and, for example, the inner diameter is 100 mm or less, and preferably 10 mm or less. In the case where the cross-sectional surface of the transfer pipe is a shape other than a circle, the inner diameter of the transfer pipe means an equivalent diameter, which is a diameter of a circle having the same area as does the cross-section of the transfer pipe.

The transfer pipe may have a heating means capable of heating the catalyst composition in its interior. The heating means is not particularly limited, and can be appropriately selected from commonly used heating means and applied. The transfer pipe can be, for example, a double pipe, and a heating medium can be passed between the inner pipe and the outer pipe to make a heating means.

The transfer pipe may have a filtration means. The filtration means is not particularly limited. It can be appropriately selected from filtration means usually used depending on the purpose, etc. The catalyst composition is preferably mixed with the prepolymer after passing through the filtration means. In the case of using a liquid feed pump for transferring the catalyst composition, a strainer may be disposed in at least one of the former stage and the latter stage of the liquid feed pump. It is preferable to arrange the strainer at the latter stage of the liquid feed pump and, for example, before introducing into the prepolymer mixing tank.

The transfer pipe is connected to the prepolymer mixing tank. The structure of the connecting portion between the transfer pipe and the prepolymer mixing tank is not particularly limited, and the pipe and tank are connected, for example, through a flange. It is preferable that the connecting portion between the transfer pipe and the prepolymer mixing tank is provided with a check valve. It is more preferable that the catalyst composition is introduced from the transfer pipe to the prepolymer mixing tank through a check valve by back pressure.

Third Step

In the third step, the transferred catalyst composition and the aromatic polycarbonate prepolymer (hereinafter simply referred to as "prepolymer" or "PP") transferred through the transfer pipe are mixed under a pressure not lower than the vapor pressure of the dialcohol compound at the temperature of the prepolymer mixing tank and not higher than 5 MPa, to obtain a prepolymer mixture.

The pressure at the time of mixing the prepolymer and the catalyst composition in the third step is not lower than the vapor pressure of the dialcohol compound at the temperature of the prepolymer mixing tank; preferably the pressure is not lower than a pressure 1 Pa above the vapor pressure of the dialcohol compound at the temperature of the prepolymer mixing tank; and more preferably the pressure is not lower than a pressure 3 Pa above the vapor pressure of the dialcohol compound at the temperature of the prepolymer mixing tank. The pressure at the time of mixing the prepolymer and the catalyst composition is 5 MPa or less, preferably 1 MPa or less, more preferably 0.1 MPa or less.

Specifically, the prepolymer and the catalyst composition is mixed, for example, under a pressure higher than 200 torr (26.7 kPa), preferably under a pressure of 500 torr (66.7 kPa) or more, more preferably under a pressure of 700 torr (93.3 kPa) or more, further preferably under a pressure of normal pressure (760 torr, 0.10 MPa) or more.

If they are mixed under a pressure of 200 torr (26.7 kPa) or more, even when the dialcohol compound has a relatively low boiling point, volatilization thereof is suppressed, and reactivity of the molecular weight increasing reaction tends to be further improved.

Preparation of a prepolymer mixture by mixing a prepolymer with a catalyst composition containing a dialcohol compound and a catalyst permits efficient production of a high molecular weight aromatic polycarbonate resin having good quality such as color hue, etc., and having a sufficiently increased molecular weight. Further, it effectively suppresses occurrence of heterogeneous structure in the molecular weight increasing reaction. Especially, even when at least either one of the alkali metal and the alkaline earth metal compound is used as the catalyst, occurrence of heterogeneous structure can be effectively suppressed while fully utilizing their excellent catalytic capability.

In the third step, the method for preparing the prepolymer mixture by mixing the catalyst composition and the aromatic polycarbonate prepolymer is not particularly limited, and can be appropriately selected from the conventionally known methods for preparing resin mixtures. The method of preparing the prepolymer mixture includes, for example, a method of using an in-line mixer. Also, the catalyst composition and the prepolymer may be mixed in the interior of the transfer pipe. In other words, the prepolymer mixing tank may also serve as a transfer pipe.

An in-line mixer is a mixer that allows direct mixing and homogenization of two or more (gas and/or liquid) fluids in a pipeline. Such an in-line mixer includes, for example, a static mixer (static type mixer), a dynamic mixer, a planetary mixer, a plow blade mixer, a kneader, an extruder, a biaxial high speed kneader, a continuous blender, etc.

The static mixer includes Sulzer mixer (Type SMX, Type SMB-H, etc.) manufactured by Sulzer, a static mixer (WB- 32A, etc.) manufactured by TOKYO NISSIN JABARA Co., LTD., a static mixer manufactured by NORITAKE CO., LIMITED, etc.

The kneader includes KRC kneader and KRC reactor manufactured by KURIMOTO LTD., and NES·KO kneader manufactured by Chemical Engineering Co., Ltd., etc.

The biaxial high speed kneader includes Type FCM kneader manufactured by Farrel Corporation, U.S.A. Type LCM kneader manufactured by KOBE STEEL, LTD., Type CIM and CPM kneaders manufactured by The Japan Steel Works, LTD.

The extruder includes Type ZSK twin-screw extruder manufactured by Warner & Pfleiderer Lebensmitteltechnik GmbH, Germany, etc.

The continuous type blender includes NES·KO blender manufactured by Chemical Engineering Co., Ltd., etc.

The mixing ratio of the catalyst composition and the prepolymer can be appropriately selected depending on the constitutions of the catalyst composition and the prepolymer, etc. For example, the dialcohol compound may be mixed in an amount of 0.01 mol to 1.0 mol, more preferably 0.1 mol to 1.0 mol, further preferably 0.1 mol to 0.5 mol, and particularly preferably 0.2 mol to 0.4 mol based on 1 mol of the total amount of terminal group of the prepolymer.

In the third step, the mixing ratio of the catalyst composition and the prepolymer is preferably such that the variation from the set mixing ratio is within a predetermined range. For example, the variation width from the set mixing ratio can be ±10% by mass or less, and preferably ±5% by mass or less. A variation width from the set mixing ratio within a predetermined range permits production of a high molecular weight aromatic polycarbonate resin of higher quality.

The prepolymer used in the production process of the present embodiment is preferably those having a high ratio of the blocking terminal groups and a relatively low concentration of the terminal hydroxyl group (preferably the concentration of the terminal hydroxyl group thereof is 1,500 ppm or less). When a dialcohol compound is added to such an aromatic polycarbonate prepolymer, the reaction between the terminal of the aromatic polycarbonate prepolymer and the dialcohol compound proceeds extremely rapidly.

The details of the blocking terminal group of the prepolymer and the concentration of the terminal hydroxyl group will be described later.

When the concentration of the terminal hydroxyl group is excessively increased by the cleavage (division) reaction, the molecular weight of the prepolymer in the prepolymer mixture to be fed to the fourth step (the molecular weight increasing step) is excessively lowered, so that sometimes the molecular weight is not sufficiently increased (high molecular weight product cannot be obtained). Or else, in order to obtain a high molecular weight aromatic polycarbonate resin having sufficiently high molecular weight, it would be necessary to lengthen the reaction time (residence time) in the fourth step. As the reaction time (residence time) in the fourth step becomes long, sometimes the quality of the obtained high molecular weight aromatic polycarbonate resin lowers, e.g., an N value (structural viscosity index) may become high, may be colored, an amount of heterogeneous structure may increase, etc.

Accordingly, in the process for producing a high molecular weight aromatic polycarbonate resin, preferably, the prepolymer and the catalyst composition are mixed under a pressure not lower than the vapor pressure of the dialcohol compound at the temperature of the prepolymer mixing tank, for example, under a pressure of exceeding 200 torr (26.7 kPa), to prepare a prepolymer mixture, and, before reaching the concentration of the terminal hydroxyl group of the prepolymer in the prepolymer mixture to 2,000 ppm, the prepolymer mixture is subjected to a molecular weight increasing reaction under reduced pressure conditions in the fourth step.

The concentration of the terminal hydroxyl group of the prepolymer in the prepolymer mixture at the time of feeding to a molecular weight increasing linking reactor is preferably less than 1,800 ppm, more preferably less than 1,600 ppm.

More ideally, it is desirable to set mixing time, mixing temperature and other mixing conditions in the third step so that only one terminal of the dialcohol compound reacts with the prepolymer. That is, the prepolymer mixture obtained in the third step contains the prepolymer, the dialcohol compound, a product obtained by reacting the dialcohol compound with the prepolymer (more preferably a product obtained by reacting only one terminal of the dialcohol compound with the prepolymer), and the added catalyst.

Sometimes the above-mentioned prepolymer mixture contains a cyclic carbonate derived from the dialcohol compound as a reaction by-product, and an aromatic monohydroxyl compound such as phenol, etc., in addition to the above-mentioned components. In addition, sometimes it contains an unreacted raw material monomer or monomers.

The mixing time in the third step is not particularly limited and can be appropriately set depending on the other mixing conditions (mixing temperature, type of the mixer, etc.) provided that the concentration of the terminal hydroxyl group of the above-mentioned prepolymer does not reach 2,000 ppm. The mixing time is preferably 7 minutes or shorter, more preferably 5 minutes or shorter, particularly preferably 3 minutes or shorter. That is, in the third step, it is preferred that after adding the catalyst composition containing the dialcohol compound to the prepolymer, the obtained prepolymer mixture is fed to a polymerization reactor (it is also referred to as a "molecular weight increasing linking reactor") in the fourth step within 7 minutes, preferably within 5 minutes, particularly preferably within 3 minutes and subjected to a molecular weight increasing reaction under reduced pressure conditions.

By shortening the mixing time in the third step, progress of the cleavage (division) reaction of the prepolymer is suppressed, and in the fourth step, the molecular weight increasing linking reaction proceeds more efficiently and the quality of the obtained high molecular weight aromatic polycarbonate resin tends to be further improved.

The mixing temperature in the third step is not particularly limited as long as it can mix the prepolymer and the catalyst composition. The mixing temperature in the third step ranges preferably 220° C. to 300° C., more preferably 260° C. to 300° C.

In addition, the mixing temperature in the third step is preferably higher than the temperature of the transfer pipe in the second step, and more preferably is a temperature 50° C. to 130° C. higher than the temperature of the transfer pipe.

The weight average molecular weight of the prepolymer in the prepolymer mixture obtained in the third step is not particularly limited, and is preferably 10,000 to 40,000, more preferably 12,000 to 35,000 (calculated as polystyrene equivalent value by GPC).

The prepolymer used in the third step may be one obtained in the step of preparing the aromatic polycarbonate prepolymer, or a commercially available product, etc. Preferably, the process for producing a high molecular weight aromatic polycarbonate resin further includes the step of preparing an aromatic polycarbonate prepolymer (hereinafter also referred to as the fifth step) in addition to the first to fourth steps.

The step of preparing an aromatic polycarbonate prepolymer preferably contains the step of subjecting the aromatic dihydroxy compound and the carbonic acid diester to a polycondensation reaction in the presence of a catalyst, to obtain an aromatic polycarbonate prepolymer.

The aromatic dihydroxy compound, which is a main raw material in the step of preparing the aromatic polycarbonate prepolymer, includes a compound represented by formula (3).

[Formula 6]

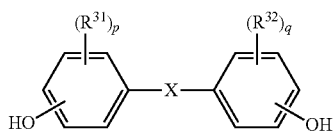

(3)

In formula (3), each of the two phenylene groups may be independently either a p-phenylene group, an m-phenylene group or an o-phenylene group, and preferably both of them are p-phenylene groups.

$R^{31}$ and $R^{32}$ in formula (3) each independently represent a halogen atom, nitro group, an amino group, an alkyl group having 1 to 20 carbon atoms, an alkoxy group having 1 to 20 carbon atoms, a cycloalkyl group having 6 to 20 carbon atoms, an aryl group having 6 to 20 carbon atoms, a cycloalkoxy group having 6 to 20 carbon atoms, an aryloxy group having 6 to 20 carbon atoms or an aralkyl group having 7 to 20 carbon atoms.

Specific examples of preferred $R^{31}$ and $R^{32}$ are fluorine, an amino group, a methoxy group, a methyl group, a cyclohexyl group, a phenyl group, etc.

p and q each represent an integer of 0 to 4, and preferably an integer of 0 to 2. X represents a single bond or a divalent group selected from the following linking group (3a). In the linking group (3a), $R^{33}$ and $R^{34}$ each independently represent a hydrogen atom, an alkyl group having 1 to 10 (preferably 1 to 6) carbon atoms or an aryl group having 6 to 10 carbon atoms, or an aliphatic ring formed by bonding $R^{33}$ and $R^{34}$ to each other.

[Formula 7]

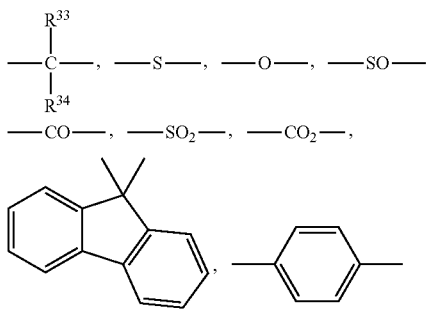

(3a)

Such an aromatic dihydroxy compound may specifically includes bis(4-hydroxyphenyl)methane, 1,1-bis(4-hydroxyphenyl)ethane, 1,2-bis(4-hydroxyphenyl)ethane, 2,2-bis(4-hydroxyphenyl)propane, 2,2-bis(4-hydroxy-3-isopropylphenyl)propane, 2,2-bis(4-hydroxyphenyl)butane, 2,2-bis(4-hydroxyphenyl)octane, 2,2-bis(3-tert-butyl-4-hydroxyphenyl)propane, 2,2-bis(3-bromo-4-hydroxyphenyl)propane, bis(4-hydroxyphenyl)phenylmethane, 1,1-bis(4-hydroxyphenyl)-1-phenylethane, bis(4-hydroxyphenyl)diphenylmethane, 2,2-bis(4-hydroxy-3-methylphenyl)propane, 1,1-bis(4-hydroxy-3-tert-butylphenyl)propane, 2,2-bis(3-cyclohexyl-4-hydroxyphenyl)propane, 1,1-bis(3-cyclohexyl-4-hydroxyphenyl)cyclohexane, 2,2-bis(3,5-dimethyl-4-hydroxyphenyl)propane, 2,2-bis(4-hydroxy-3-phenylphenyl)propane, 2,2-bis(3-cyclohexyl-4-hydroxyphenyl)propane, 2,2-bis(4-hydroxy-3-bromophenyl)propane, 2,2-bis(3,5-dibromo-4-hydroxyphenyl)propane, 1,1-bis(4-hydroxyphenyl)cyclopentane, 1,1-bis(4-hydroxyphenyl)cyclohexane, 2,2-bis(4-hydroxy-3-methoxyphenyl)propane, 1,1-bis(4-hydroxyphenyl)-3,3,5-trimethylcyclohexane, 4,4'-dihydroxydiphenyl ether, 4,4'-dihydroxybiphenyl, 9,9-bis(4-hydroxyphenyl)fluorene, 9,9-bis(4-hydroxy-3-methylphenyl)fluorene, 1,1-bis(4-hydroxyphenyl)cyclohexane, 1,1-bis(4-hydroxyphenyl)cyclopentane, 4,4'-dihydroxy-3,3'-dimethylphenyl ether, 4,4'-dihydroxyphenylsulfide, 4,4'-dihydroxy-3,3'-dimethyldiphenylsulfide, 4,4'-dihydroxydiphenylsulfoxide, 4,4'-dihydroxy-3,3'-dimethyldiphenylsulfoxide, 4,4'-dihydroxydiphenylsulfone, 4,4'-dihydroxy-3,3'-dimethyldiphenylsulfone, 2,2'-diphenyl-4,4'-dihydroxydiphenylsulfonyl, 2,2'-dimethyl-4,4'-dihydroxydiphenylsulfonyl, 1,3-bis{2-(4-hydroxyphenyl)propyl}benzene, 1,4-bis{2-(4-hydroxyphenyl)propyl}benzene, 1,4-bis(4-hydroxyphenyl)cyclohexane, 1,3-bis(4-hydroxyphenyl)cyclohexane, 4,8-bis(4-hydroxyphenyl)tricyclo[5.2.1.0$^{2,6}$]decane, 4,4'-(1,3-adamanthanediyl)diphenol and 1,3-bis(4-hydroxyphenyl)-5,7-dimethyladamanthane, etc.

Of these, 2,2-bis(4-hydroxyphenyl)propane (hereinafter also referred to as bisphenol A or BPA) is preferred, because it is stable and a grade with a small impurity content is easily available. More than one of the above-mentioned aromatic dihydroxy compounds may be combined as required.

In the step of preparing the aromatic polycarbonate prepolymer, if necessary, a dicarboxylic acid compound such as terephthalic acid, isophthalic acid, naphthalene-dicarboxylic acid, 1,4-cyclohexanedicarboxylic acid, etc., may be used in combination with the above-mentioned aromatic dihydroxy compound to prepare an aromatic polycarbonate prepolymer containing a polyester carbonate.

In addition, in the step of preparing the aromatic polycarbonate prepolymer, a polyfunctional compound having 3 or more, preferably 3 to 6 functional groups in the molecule can be used in combination. As a polyfunctional compound, such a compound having a phenolic hydroxyl group, a carboxyl group, etc., is preferably used, and 1,1,1-tris(4-hydroxyphenyl)ethane is particularly preferably used.

The carbonic acid diester in the step of preparing the aromatic polycarbonate prepolymer includes the compound represented by formula (4).

[Formula 8]

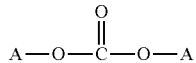

(4)

Here, A's in formula (4) each independently represent a substituted or unsubstituted, linear, branched or cyclic monovalent hydrocarbon group having 1 to 10 carbon atoms. The two A's may be the same or different from each other. Of these, A is preferably a substituted or unsubstituted aromatic hydrocarbon group.

Specific examples of the carbonic acid diester include an aromatic carbonic acid diester such as diphenyl carbonate, ditolyl carbonate, bis(2-chlorophenyl) carbonate, m-cresyl carbonate, dinaphthyl carbonate, bis(4-phenylphenyl) carbonate, etc. In addition, dimethyl carbonate, diethyl carbonate, dibutyl carbonate, dicyclohexyl carbonate, etc., may be also used, if desired. Of these, diphenyl carbonate is preferred in the viewpoints of reactivity, stability against coloration of the resulting resin, and cost.

In the step of preparing the aromatic polycarbonate prepolymer, it is preferable to use carbonic acid diester in excess relative to the amount of the aromatic dihydroxy compound in order to introduce blocking terminal groups to the aromatic polycarbonate prepolymer. More preferably, the charging ratio of the aromatic dihydroxy compound and the carbonic acid diester is set to a ratio of carbonic acid diester/aromatic dihydroxy compound=1.01 to 1.30 (molar ratio). That is, the carbonic acid diester is preferably used in a ratio of 1.01 mol to 1.30 mol, more preferably 1.02 mol to 1.20 mol, particularly preferably 1.03 mol to 1.15 mol relative to 1 mol of the total of the aromatic dihydroxy compound(s).

The polycondensation reaction between the aromatic dihydroxy compound and the carbonic acid diester in the step of preparing the aromatic polycarbonate prepolymer is carried out in the presence of a catalyst. As the catalyst, a transesterification catalyst such as a basic compound catalyst, etc., usually used as a catalyst for producing a polycarbonate can be used, and the same catalyst as described in the first step would apply. In the following, the catalyst in the first step is also referred to as a first catalyst, and the catalyst in the step of preparing the aromatic polycarbonate prepolymer is also referred to as a second catalyst.

The second catalyst is preferably at least one member selected from the group consisting of an alkali metal compound and an alkaline earth metal compound. It is more preferable to use at least one member selected from the group consisting of cesium carbonate, sodium hydrogencarbonate, sodium tetraphenylborate, disodium phenylphosphate and potassium carbonate. And at least one of cesium carbonate and potassium carbonate is further preferable. These second catalysts may be used alone or in combination of two or more.

The second catalyst in the step of preparing the aromatic polycarbonate prepolymer is used, for example, in a ratio of $1 \times 10^{-6}$ mol or less, preferably $1 \times 10^{-8}$ mol to $1 \times 10^{-6}$ mol, and further preferably $1 \times 10^{-7}$ mol to $1 \times 10^{-6}$ mol relative to 1 mol of the total of the aromatic dihydroxy compound(s).

The molar ratio of the first catalyst and the second catalyst to be used ranges preferably 1:9 to 9:1, more preferably 3:7 to 8:2, further preferably 4:6 to 7:3, and particular preferably 5:5 to 7:3. The molar ratio is applied preferably when the first catalyst and the second catalyst are both at least one selected from the group consisting of the alkali metal compounds and the alkaline earth metal compounds.

Further, the total amount of the first and second catalysts to be used ranges, for example, $1 \times 10^{-6}$ mol or less, preferably $1 \times 10^{-8}$ mol to $1 \times 10^{-6}$ mol, and more preferably $1 \times 10^{-7}$ mol to $1 \times 10^{-6}$ mol relative to 1 mol of the total of the aromatic dihydroxy compound(s) to be used in the step of preparing the aromatic polycarbonate prepolymer.

The step of preparing aromatic polycarbonate prepolymer is preferably carried out in the copresence of a cocatalyst in addition to the second catalyst (preferably at least one selected from the group consisting of an alkali metal compound and an alkaline earth metal compound). By using such a cocatalyst, the aromatic polycarbonate prepolymer can be prepared more efficiently.

As the cocatalyst, it is preferable to use a nitrogen-containing compound among the transesterification catalysts. Details of the nitrogen-containing compound are as mentioned above. Specifically, as the cocatalyst, at least one member selected from the group consisting of quaternary ammonium hydroxides is preferably used, at least one member selected from the group consisting of tetraalkylammonium hydroxides is more preferably used, and tetramethylammonium hydroxide is further preferably used.

The amount of the cocatalyst to be used ranges, for example, $1 \times 10^{-3}$ mol or less, preferably $1 \times 10^{-7}$ mol to $1 \times 10^{-3}$ mol, and more preferably $1 \times 10^{-6}$ mol to $1 \times 10^{-4}$ mol relative to 1 mol of the total of the aromatic dihydroxy compound(s).

In the step of preparing the aromatic polycarbonate prepolymer, it is preferable to produce an aromatic polycarbonate prepolymer by subjecting the aromatic dihydroxy compound and the carbonic acid diester, which are the main raw materials, to a polycondensation reaction in a polycondensation reactor in the presence of a second catalyst. This polycondensation reaction is a melt polycondensation reaction based on a transesterification reaction.

One or two or more polycondensation reactors are used for carrying out the step of preparing the aromatic polycarbonate prepolymer. When two or more reactors are used, they may be connected in series. The reactors are preferably used by connecting in series with two or more reactors, more preferably 2 to 6 reactors, and particularly preferably 3 to 5 reactors. The polycondensation reactor may be either a vertical type or a horizontal type, and preferably a vertical type.

In each of the polycondensation reactors, a stirring device such as the conventionally known stirring blade can be provided. Specific examples of the stirring blade include an anchor stirring blade, a Max Blend blade, a double helical ribbon blade, etc.

When the polycondensation reactor has a plurality of inner coils arranged substantially in parallel, it is also preferable that the ratio (A/B) of the center-to-center distance A between adjacent inner coils to the outer diameter B of the inner coil is 1.6 to 4. 0.

The reaction conditions in the polycondensation reactor are preferably set, respectively, so that the temperature becomes higher, the vacuum becomes higher and the stirring rate becomes lower as the polycondensation reaction proceeds. During the polycondensation reaction, it is preferable to control the liquid level so that the average residence time in each reactor ranges, for example, about 30 minutes to 120 minutes in the reactor before addition of a linking agent. In each reactor, phenol concurrently by-produced simultaneously with the melt polycondensation reaction can be distilled out of the system by a distillation pipe attached to each reactor.

The degree of reduced pressure in the step of preparing the aromatic polycarbonate prepolymer preferably ranges 0.0075 torr to 100 torr (1 Pa to 13.3 kPa), and the inner temperature of the reactor preferably ranges 140° C. to 300° C.

The number of rotation of the stirring blade of the reactor is not particularly limited, and is preferably maintained at 10 rpm to 200 rpm. The polycondensation reaction is preferably carried out while keeping the liquid level constant while maintaining a predetermined average residence time and while distilling phenol, etc., by-produced as the reaction progresses from the distillation pipe. The average residence time in each reactor is not particularly limited, and it is usually from 30 minutes to 120 minutes.

The weight average molecular weight of the aromatic polycarbonate prepolymer obtained in the step of preparing the aromatic polycarbonate prepolymer is not particularly limited, and is preferably 10,000 to 50,000, more preferably 15,000 to 35,000 (calculated in terms of polystyrene equivalent by GPC).

It is preferable that at least a part of the terminal groups of the aromatic polycarbonate prepolymer is blocked with a blocking terminal group. The compound constituting the blocking terminal group is not particularly limited and, for example, an aromatic monohydroxyl compound can be preferably used. The ratio of the amount of the terminal blocking by the aromatic monohydroxyl compound to the total amount of the terminal of the aromatic polycarbonate prepolymer is not particularly limited. It ranges, for example, 60 mol % or more, and preferably 80 mol % or more.

The concentration of the terminal hydroxyl group of the aromatic polycarbonate prepolymer is preferably 1,500 ppm or less, more preferably 1,000 ppm or less, further preferably 750 ppm or less, and particularly preferably 500 ppm or less. Use of an aromatic polycarbonate prepolymer having a concentration of the terminal hydroxyl group within this range or an amount of the blocked terminal within this range tends to provide a sufficiently high molecular weight aromatic polycarbonate resin with good productivity.

In the present specification, the ratio of the amount of the blocked terminal to the total amount of the terminal of the polymer (containing the aromatic polycarbonate prepolymer and the high molecular weight aromatic polycarbonate resin) as well as the concentration of the hydroxyl group can be analyzed by $^1$H-NMR analysis of the polymer. A specific method of $^1$H-NMR analysis is described in Examples described later. Also, the concentration of the terminal hydroxyl group in the polymer can be measured also by spectroscopic measurement with Ti complex. Specifically, it is a method of measuring the concentration of the terminal hydroxyl group (OH concentration) in the polymer according to the method described in Makromolekulare Chemie 88 (1965) 215-231, ultraviolet-visible spectroscopic analysis (wavelength: 546 nm) of a complex formed from a polymer and titanium tetrachloride in a methylene chloride solution. As the apparatus, for example, Hitachi U-3500 ultraviolet-visible spectrophotometer can be used. The concentration of the terminal hydroxyl group (OH concentration) in the polymer can be determined with reference to ultraviolet-visible spectroscopic analysis (wavelength: 546 nm) of a complex formed from concentration-known BPA and titanium tetrachloride.

Here, the "total amount of the terminal group of the aromatic polycarbonate prepolymer" is calculated to be 1 mol, when, for example, it concerns 0.5 mol of a polycarbonate having no branch (or linear polycarbonate).

Specific examples of the blocking terminal group include a terminal group derived from an aromatic monohydroxyl compound such as a phenyl group, a cresyl group, an o-tollyl group, a p-tollyl group, a p-tert-butylphenyl group, a biphenyl group, an o-methoxycarbonylphenyl group, a p-cumylphenyl group, etc. Of these, preferred is a terminal group derived from an aromatic monohydroxyl compound having a low boiling point, which is likely to be removed from the reaction system by a molecular weight increasing linking reaction with a dialcohol compound, and particularly preferred are a phenyl group, a p-tert-butylphenyl group, etc.

In the melting method, a blocking terminal group can be introduced by using carbonic acid diester in excess relative to the aromatic dihydroxy compound at the time of producing the aromatic polycarbonate prepolymer. Specifically, the carbonic acid diester is used in an amount of 1.01 mol to 1.30 mol, more preferably 1.02 mol to 1.20 mol, and particularly preferably 1.03 mol to 1.15 mol relative to 1 mol of the aromatic dihydroxy compound, although the ratio may vary depending on the apparatus used for the reaction and the reaction conditions. According to this procedure, an aromatic polycarbonate prepolymer satisfying the above-mentioned amount of terminal blocking can be obtained.

Fourth Step (Molecular Weight Increasing Step)

In the step of increasing the molecular weight of the prepolymer, a high molecular weight aromatic polycarbonate resin is produced by heating the prepolymer mixture under reduced pressure conditions to increase the molecular weight.

The step of increasing the molecular weight of the prepolymer is preferably carried out in a molecular weight increasing linking reactor (transesterification polymerization apparatus) provided in series with the prepolymer mixing tank in the third step. As the molecular weight increasing linking reactor used in the molecular weight increasing step, one reactor or two or more reactors can be used, and preferably one reactor (single reactor) is used.

The prepolymer mixture may be transferred through a transfer pipe to a molecular weight increasing linking reactor. The transfer pipe for transferring the prepolymer mixture may be provided with heating means. The transfer pipe for transferring the prepolymer mixture may be in the same manner as the transfer pipe of the catalyst composition.

Also, a pressure regulating valve may be disposed between the prepolymer mixing tank and the molecular weight increasing linking reactor, and a back pressure may be applied to the prepolymer mixture by the pressure regulating valve to transfer the mixture from the prepolymer mixing tank to the molecular weight increasing linking reactor.

The pressure reduction condition in the step of increasing the molecular weight of the prepolymer is, for example, 10 torr (1.33 kPa) or less, preferably 2.0 torr or less (267 Pa or less), more preferably 0.01 torr to 1.5 torr (1.3 Pa to 200 Pa), and further preferably 0.01 torr to 1.0 torr (1.3 Pa to 133 Pa). The pressure in the step of increasing the molecular weight of the prepolymer may be detected by a pressure detecting means disposed in a branch pipe disposed in a reduced pressure line provided in the molecular weight increasing linking reactor.

The temperature condition of the heat treatment in the step of increasing the molecular weight of the prepolymer ranges, for example, 240° C. to 320° C., preferably 260° C. to 310° C., and more preferably 280° C. to 310° C.

Also, the temperature condition of the heat treatment in the step of increasing the molecular weight of the prepolymer is preferably not higher than a temperature 80° C. above the temperature Tc of the transfer pipe of the prepolymer mixing tank or the prepolymer mixture, more preferably not higher than a temperature 50° C. above the temperature Tc.

In the step of increasing the molecular weight of the prepolymer, the oxygen concentration in the molecular weight increasing linking reactor is preferably set to be within the range of 0.0001% by volume to 10% by volume, and more preferably 0.0001% by volume to 5% by volume. Thereby, it is possible to effectively suppress oxidative deterioration of the dialcohol compound. In order to obtain this oxygen concentration conditions, it is preferable to replace the gas in the reactor with a gas having an oxygen concentration of 10% by volume or less (preferably an inert gas such as nitrogen, argon, etc.), and further devolatilize the gas.

As the molecular weight increasing linking reactor used in the step of increasing the molecular weight of the prepolymer, a horizontal stirring reactor is used. Preferably used is a mono-axial horizontal stirring reactor having one stirring shaft or multi-axial horizontal stirring reactor having a plurality of stirring shafts, wherein at least one of the above-mentioned stirring shafts has a horizontal rotating shaft and stirring blades, which are discontinuous with each other, attached to the shaft at a substantially right angle, and wherein the L/D value ranges from 1 to 15, preferably from 2 to 10, when L is a length of the horizontal rotating shaft and D is a rotation diameter of the stirring blade. Of these, more preferred is a multi-axial horizontal stirring reactor having a plurality of stirring shafts.

In addition, also may be used is a mono-axial horizontal stirring reactor having one continuous screw type stirring shaft or multi-axial horizontal stirring reactor having a plurality of the same type stirring shafts, represented by an extruder, wherein the L/D value ranges from 20 to 100, more preferably 40 to 80, when L is a length of the stirring shaft and D is a diameter of the screw. Of these, more preferred is a multi-axial horizontal stirring reactor having a plurality of stirring shafts.

Preferably, these horizontal stirring reactors each have a supply port for the prepolymer mixture in one end and a draw-out port for the produced high molecular weight polycarbonate resin on the opposite end.

In the molecular weight increasing linking reactor, any conventionally known stirring device such as a stirring blade can be provided. Specific examples of the stirring blade include a two-shaft type stirring blade, paddle blade, lattice blade, spectacle blade, extruder screw type blades, etc.

Also, in the above-mentioned molecular weight increasing linking reactor, a draw-out device can be provided. The high molecular weight polycarbonate resin (polycarbonate copolymer) obtained by the above-mentioned molecular weight increasing linking reactor is a high viscosity resin having a flowability at 280° C. of about 2,500 Pa·s (or a melt mass flow rate based on ISO 1133 of about 5.3 g/10 minutes), and it is sometimes difficult to extract the resin from the molecular weight increasing linking reactor, so it is preferable to use a draw-out device. Specific examples of the draw-out device include a gear pump, a screw draw-out device, etc., and preferably a screw drawing machine is used.

When the molecular weight increasing linking reactor is provided with a draw-out device, the outlet pressure variation of the draw-out device is preferably 20% or less, and more preferably 0.1% or more and 20% or less.

In each of the reactors, a distillation pipe for discharging by-products, etc., produced by the reaction, a condenser such as a condenser, dry ice trap, etc., a receiver of a recovery tank, etc., and a decompression device for maintaining the predetermined depressurized state, etc., can be provided.

In the above-mentioned horizontal stirring reactor, it is preferable to have a draw-out device of the resulting polycarbonate resin on the end opposite to the supply port of the prepolymer mixture. As the draw-out device, a gear pump or a screw draw-out device is preferable, and particularly preferably a screw draw-out device is used.

Further, as a shaft seal of the above-mentioned rotating shaft, it is preferable to adopt a sealing mechanism including a mechanical seal.

In order to efficiently remove by-produced aromatic monohydroxy compounds, the surface renewal property of the molecular weight increasing linking reactor used in the step of increasing the molecular weight of the prepolymer is not particularly limited, and it is desirable that the surface renewal effect defined by the following equation (II) is preferably in the range of 0.01 to 500, further preferably 0.01 to 100, and particularly preferably 0.01 to 50.

$$\text{Surface renewal effect} = A = Re^{0.5} \times n \div V \quad \text{(II)}$$

A: Surface area ($m^2$)
n: Rotation number/s
V: Liquid volume ($m^3$)
Re (Reynolds number): $Re = \rho \times n \times r^2 \div \mu$
$\rho$: Liquid density ($kg/m^3$)
r: Diameter of stirrer (m)
$\mu$: Liquid viscosity (kg/m·s)

The material of the reactor used in the process for producing the high molecular weight aromatic polycarbonate resin is, in a region occupying at least 90% of the total surface area of the portion in contact with the raw material monomer or with the reaction mixture (hereinafter referred to as "liquid-contact portion"), preferably at least one member selected from the group consisting of (a) a metal material having an iron content of 80% by mass or less and a Cr content of 18% by mass or more, or a stainless steel such as SUS304, SUS316, SUS316L, SUS310S, etc., or a cladding material, and (b) a glass material. When a glass material is selected as the above-mentioned material, it further preferably shows an alkali metal dissolution amount of 15 ppb/$cm^2$ or less when immersed in pure water at 50° C. for 120 hours.

It is most preferable that the liquid-contact portion of all of the reactors used in the process for producing the high molecular weight aromatic polycarbonate resin is made of the above-mentioned materials, but it is not always necessary that the liquid-contact portion of all of the reactors is made of the above-mentioned materials, and it is preferable that at least the molecular weight increasing linking reactor used in the step of increasing the molecular weight of the prepolymer is made of the above-mentioned materials.

In addition, the reactor used in the process for producing the high molecular weight aromatic polycarbonate resin is preferably electropolished in a region occupying at least 90% of the total surface area of the liquid-contact portion.

It is most preferable that the liquid-contact portions of all of the reactors used in the process for producing the high molecular weight aromatic polycarbonate resin are electropolished, but it is not always necessary that the liquid-contact portions of all of the reactors are electropolished, and it is preferable that at least the liquid-contact portion of the molecular weight increasing linking reactor used in the step of increasing the molecular weight of the prepolymer is electropolished.

Specific examples of the preferred reactors mentioned above are listed below, but the present invention is not limited thereto.

1) Specific examples of an apparatus in which a multi-axial horizontal stirring reactor having a plurality of stirring shafts, wherein at least one of the above-mentioned stirring shafts has stirring blades, which are discontinuous with each other, attached to the horizontal rotating shaft at a substantially right angle to the horizontal rotating shaft, and wherein the L/D ratio ranges from 1 to 15, wherein L is a length of the horizontal rotating shaft and D is a rotation diameter of the stirring blade, include a spectacle blade polymerization apparatus (manufactured by Hitachi, Ltd.), Continuous LIST Kneader Reactor (manufactured by LIST), AP-Reactor (manufactured by LIST), SCR (manufactured by Mitsubishi Heavy Industries, Ltd.) and KRC reactor (manufactured by KURIMOTO LTD.).

2) Specific examples of an apparatus in which a mono-axial horizontal stirring reactor having one stirring shaft, wherein the above-mentioned stirring shaft has stirring blades, which are discontinuous with each other, attached to the horizontal rotating shaft at a substantially right angle to the horizontal rotating shaft, and wherein the L/D ratio ranges from 1 to 15, wherein L is a length of the horizontal rotating shaft and D is a rotation diameter of the stirring blade, include Continuous LIST Kneader Reactor (manufactured by LIST).

3) Specific examples of an apparatus in which a multi-axial horizontal stirring reactor having a plurality of continuous screw type stirring shafts, and wherein the L/D ratio ranges from 20 to 100, wherein L is a length of the stirring shaft and D is a diameter of the screw, include a twin-screw extruder TEX series (manufactured by THE JAPAN STEEL WORKS, LTD.), a twin-screw extruder TEM series (manufactured by TOSHIBA MACHINE CO., LTD.) and Type ZSK twin-screw extruder (manufactured by Warner & Pfleiderer Lebensmitteltechnik GmbH).

4) Specific examples of an apparatus in which a mono-axial horizontal stirring reactor having one continuous screw type stirring shaft, wherein the L/D ratio range from 20 to 100, wherein L is a length of the stirring shaft and D is a diameter of the screw, include Busscokneader (manufactured by Buss).

The process for producing the high molecular weight aromatic polycarbonate resin preferably further comprises the step of removing the cyclic carbonate, in which at least a part of the cyclic carbonate produced in the step of increasing the molecular weight of the prepolymer is removed to the outside of the reaction system. It is more preferable that the step of removing the cyclic carbonate includes the step of removing the distillate containing at least a part of the cyclic carbonate formed in the step of increasing the molecular weight of the prepolymer to the outside of the reaction system.

That is, in the step of increasing the molecular weight of the prepolymer, the aromatic polycarbonate prepolymer reacts with each other using a dialcohol compound as a linking agent to increase the molecular weight, and at the same time, at least a part of the by-produced cyclic carbonate by the reaction is removed to the outside of the reaction system, whereby the molecular weight increasing reaction of the aromatic polycarbonate prepolymer proceeds more efficiently.

The step of increasing the molecular weight of the prepolymer and the step of removing the cyclic carbonate can be carried out separately physically and temporally, but they can be carried out simultaneously, and preferably carried out simultaneously.

The by-produced cyclic carbonate is preferably a compound having a structure represented by formula (2a).

[Formula 9]

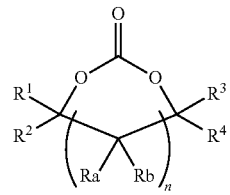

(2a)

In formula (2a), Ra and Rb each independently represent a hydrogen atom, a halogen atom, a linear or branched alkyl group having 1 to 30 carbon atoms which may contain an oxygen atom(s) or a halogen atom(s), a cycloalkyl group having 3 to 30 carbon atoms which may contain an oxygen atom(s) or a halogen atom(s), an aryl group having 6 to 30 carbon atoms which may contain an oxygen atom(s) or a halogen atom(s), or an alkoxy group having 1 to 15 carbon atoms which may contain an oxygen atom(s) or a halogen atom(s), or Ra and Rb may be bonded to each other to form a ring. The halogen atom is preferably a fluorine atom.

$R^1$ to $R^4$ each independently represent a hydrogen atom, a halogen atom or a linear or branched alkyl group having 1 to 5 carbon atoms. The halogen atom is preferably a fluorine atom.

n is an integer of 1 to 30, preferably 1 to 6, more preferably 1 to 3, and particularly preferably 1.

In formula (2a), Ra and Rb preferably each independently represent a hydrogen atom, a halogen atom, a linear or branched alkyl group having 1 to 8 carbon atoms, a cycloalkyl group having 3 to 8 carbon atoms, an aryl group having 6 to 10 carbon atoms or an alkoxy group having 1 to 8 carbon atoms, or Ra and Rb may be bonded to each other to form an alicyclic ring having 3 to 8 carbon atoms. The halogen atom is preferably a fluorine atom.

$R^1$ to $R^4$ preferably each independently represent a hydrogen atom, a fluorine atom or a methyl group.

n is preferably an integer of 1 to 6.

In formula (2a), Ra and Rb more preferably each independently represent a hydrogen atom or a linear or branched alkyl group having 1 to 5 carbon atoms, further preferably a linear or branched alkyl group having 1 to 4 carbon atoms. Particularly preferably specific examples include a methyl group, an ethyl group, a propyl group, an n-butyl group and an isobutyl group. $R^1$ to $R^4$ are more preferably a hydrogen atom. n is more preferably an integer of 1 to 3.

The cyclic carbonate represented by formula (2a) above is more preferably the compound represented by formula (2b) below. In formula (2b), Ra and Rb are the same as defined in formula (2a) above.

[Formula 10]

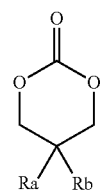

(2b)

Specific examples of the above-mentioned cyclic carbonate include the compounds having the structure shown below.

[Formula 11]

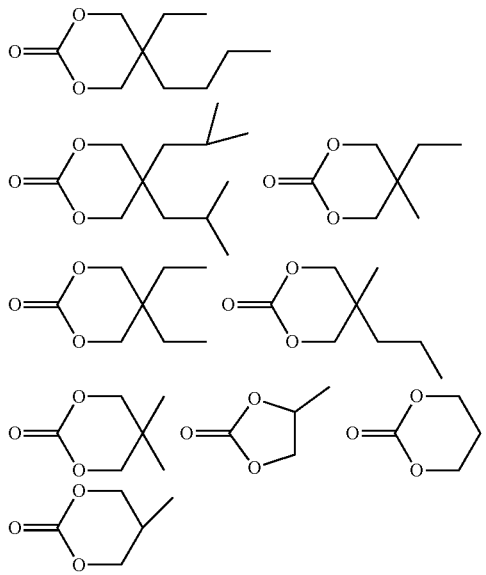

The production process of the present embodiment using the dialcohol compound having the structure represented by formula (1) has an advantage that it allows the step of increasing a molecular weight of the prepolymer to proceed at a higher rate than the conventional production process of a polycarbonate by melting method.

On the other hand, in the production process of the present embodiment, sometimes a cyclic carbonate having a particular structure is by-produced as the molecular weight increasing reaction proceeds. After removing the by-produced cyclic carbonate from the reaction system, a high molecular weight polycarbonate resin having substantially the same skeleton as the homopolycarbonate resin can be obtained. The by-produced cyclic carbonate has a structure reflecting the structure of the dialcohol compound used in the step of increasing the molecular weight of the prepolymer, and is believed to be a cyclic form derived from the dialcohol compound, but the reaction mechanism by which the cyclic carbonate is by-produced accompanied by such a high molecular weight forming reaction is not necessarily clear.

The molecular weight increased aromatic polycarbonate resin obtained by the production process using the dialcohol compound having the structure represented by formula (1) contains almost no structural unit derived from the dialcohol compound, and the skeleton of the resin is almost the same as the homopolycarbonate resin.

That is, the resin does not contain any structural unit derived from the dialcohol compound as the linking agent in the skeleton or, even if it contains some, it contains such a unit in an extremely small amount, and as the result, the resin has extremely high thermal stability and excellent heat resistance. On the other hand, it has desirable properties such as low N value (structural viscosity index), excellent flowability, low proportion of units having heterogeneous structure, excellent color hue, etc., while having the same skeleton as the conventional homopolycarbonate resins.

When a structural unit derived from the dialcohol compound is contained in the skeleton of the high molecular weight aromatic polycarbonate resin obtained by the process for producing a high molecular weight aromatic polycarbonate resin, the ratio of the amount of the structural unit derived from the dialcohol compound to the amount of the total structural unit of the high molecular weight aromatic polycarbonate resin is 1 mol % or less, more preferably 0.1 mol % or less.

The method for removing the by-produced cyclic carbonate from the reaction system includes a method in which a distillate formed in the above-mentioned step of increasing the molecular weight of the prepolymer is distilled off to out of the reaction system. That is, the by-produced cyclic carbonate is distilled off as a distillate, which also contains the aromatic monohydroxyl compound such as phenol, etc., which is also by-produced in the same step, and the unreacted raw material compound(s) (the dialcohol compound, the carbonic acid diester, etc.). The distillation conditions are not particularly limited, and the temperature in the reactor when distilling off the distillate from the reaction system ranges preferably 240° C. to 320° C., more preferably 260° C. to 310° C., and further preferably 280° C. to 310° C.

The removal is carried out on at least a part of the by-produced cyclic carbonate. It is most preferable to remove all of the by-produced cyclic carbonate, but it is generally difficult to remove them completely. In the case where a complete removal is not possible, it is tolerated that the cyclic carbonate be remained in the aromatic polycarbonate resin product. The preferable upper limit of the residual amount in the product is 3,000 ppm, more preferable upper limit is 1,000 ppm, further preferable upper limit is 500 ppm, and particularly preferable upper limit is 300 ppm.

One of the characteristic features of the production process of the present embodiment is that the process can achieve high molecular weight in a short time from the start of the step of increasing the molecular weight of the prepolymer.

More specifically, according to the production process of the present embodiment, the relationship between the weight average molecular weight (MwPP) of the aromatic polycarbonate prepolymer and the weight average molecular weight (Mw) of the high molecular weight aromatic polycarbonate resin obtained in the step of increasing the molecular weight of the prepolymer can be represented by equation (IV). Here, in equation (IV) below, k' (unit; Mw increased amount/minute)) is a number of 400 or more.

$$(Mw-Mw_{PP})/\text{Heating time(min)}=k' \qquad (IV)$$

According to the production process of the present embodiment, the number k' in equation (IV) above can be made 400 or more, preferably 500 or more. That is, it is now possible to efficiently achieve a predetermined high molecular weight by increasing the molecular weight in a short period of time from the start of the reaction in the step of increasing the molecular weight of the prepolymer.

The weight average molecular weight (Mw) of the high molecular weight aromatic polycarbonate resin obtained by the production process of the present embodiment is preferably 35,000 to 100,000, more preferably 35,000 to 80,000, and particularly preferably 40,000 to 75,000.

A polycarbonate resin having a high molecular weight is suitable for applications such as blow molding and extrusion molding, etc., since it has a high melt tension and hardly causes drawdown. Even when it is used for injection molding, the resin causes no string drawing, etc., and has a good moldability. Further, the resulting molded article is superior in physical properties such as mechanical properties, heat resistance, organic solvent resistance, etc.

In the high molecular weight aromatic polycarbonate resin obtained by the production process of the present embodiment, the N value (structural viscosity index) represented by equation (I) below is preferably 1.30 or less, more preferably 1.28 or less, further preferably 1.25 or less, and particularly preferably 1.22 or less.

$$N \text{ value}=(\log(Q160 \text{ value})-\log(Q10 \text{ value}))/(\log 160-\log 10) \quad (I)$$

In equation (I) above, the Q160 value represents a melt flow volume per unit time (ml/sec) (measured using Type CFT-500D manufactured by Shimadzu Corporation (hereinafter the same), calculated from Stroke=7.0 mm to 10.0 mm) measured at 280° C. under a load of 160 kg, and the Q10 value represents a melt flow volume per unit time (ml/sec) (calculated from Stroke=7.0 mm to 10.0 mm) measured at 280° C. under a load of 10 kg. Note that the nozzle has a diameter of 1 mm and a length of 10 mm The structural viscosity index "N value" is an index of the degree of branching of aromatic polycarbonate resins. The high molecular weight aromatic polycarbonate resin obtained by the production process of the present embodiment has a low N value, a small content of the branched structure and a high ratio of linear structure. Aromatic polycarbonate resins generally tend to have a higher flowability (Q value becomes high) even if the ratio of the branched structure is increased at the same Mw, but the high molecular weight aromatic polycarbonate resin obtained by the continuous production process of the present embodiment has accomplished a high flowability (high Q value) while maintaining a low N value.

The high molecular weight aromatic polycarbonate resin obtained by the production process of the present embodiment has a good color hue.

The evaluation of the color hue of aromatic polycarbonate resins is generally expressed by YI value. Usually, the YI value of the aromatic polycarbonate resins obtained from the interfacial polymerization method falls within the range of 0.8 to 1.0. In contrast, in the high molecular weight materials of the aromatic polycarbonates obtained by the melt polymerization method, the YI value ranges from 1.7 to 2.0 due to deterioration in quality attributable to the production process. However, the high molecular weight aromatic polycarbonate resin obtained by the production process of the present embodiment shows a YI value equivalent to that of the aromatic polycarbonates obtained by the interfacial polymerization method, with no deterioration of color hue observed.

The high molecular weight aromatic polycarbonate resin obtained by the production process of the present embodiment is of excellent quality with a small content of structural unit having a heterogeneous structure. The structural unit having a heterogeneous structure refers to a structural unit having a structure which has a potential risk of causing undesirable effects, and includes a branch point structural unit which is often contained in a polycarbonate obtained by a conventional melting method, etc. The structural unit having a heterogeneous structure may be present in the skeleton of polycarbonate resins either repeatedly or in random.

The amount of the heterogeneous structure in the aromatic polycarbonate resin is, for example, as the content of the heterogeneous structure (PSA) containing a substructure derived from salicylic acid, preferably 1,000 ppm or less, more preferably 800 ppm or less in the total structural units.

The concentration of the terminal hydroxyl group contained in the high molecular weight aromatic polycarbonate resin obtained by the production process the present embodiment is not particularly limited, and is appropriately selected depending on the purpose, etc. The concentration of the terminal hydroxyl group is, for example, 1,000 ppm or less, preferably 600 ppm or less.

The process for producing a high molecular weight aromatic polycarbonate resin may include the step of adding a deactivating agent of the catalyst to an aromatic polycarbonate resin having an increased molecular weight. In general, it is suitably carried out by a method of deactivating the catalyst by adding any conventionally known acidic substance. Specifically, the acidic substance (catalyst deactivating agent) includes an aromatic sulfonic acid such as p-toluenesulfonic acid, etc.; an aromatic sulfonic acid ester such as butyl paratoluenesulfonate, etc.; an aromatic sulfonic acid salt such as tetrabutylphosphonium dodecylbenzenesulfonate, tetrabutylammonium paratoluenesulfonate, etc.; an organic halide such as stearic acid chloride, butyric acid chloride, benzoyl chloride, toluenesulfonic acid chloride, benzyl chloride, etc.; an alkylsulfate such as dimethylsulfate; a phosphoric acid salt; a phosphorous acid, etc.

Of these, a catalyst deactivating agent selected from the group consisting of paratoluenesulfonic acid, butyl paratoluenesulfonate, tetrabutylphosphonium dodecylbenzenesulfonate, and tetrabutylammonium paratoluenesulfonate is suitably used.

Addition of the catalyst deactivating agent can be carried out by mixing it with the polycarbonate resin by any conventionally known method after completion of the above-mentioned molecular weight increasing reaction. For example, a method of dispersing and mixing the agent with a high-speed mixer represented by a turnbull mixer, a Henschel mixer, a ribbon blender, a super mixer, etc., followed by melting and kneading the mixture with an extruder, a B anbury mixer, a roll, etc., is appropriately selected.

After deactivation of the catalyst, the step of devolatilizing and removing low boiling point compounds in the high molecular weight aromatic polycarbonate resin at a pressure of 0.013 kPa to 0.13 kPa (0.1 torr to 1 torr) at a temperature of 200° C. to 350° C. may be provided. For this purpose, a horizontal apparatus having stirring blades with superior surface renewal ability such as paddle blades, lattice blades, spectacle blades, etc., or a thin film evaporator is suitably used.

It is preferably a biaxial extruder or horizontal type reactor having a polymer seal and having a vent structure.

Further, the process for producing a high molecular weight aromatic polycarbonate resin may include the step of adding a heat resistant stabilizer, a hydrolysis stabilizer, an antioxidant, a pigment, a dye, a reinforcing agent, a filler, an ultraviolet absorber, a lubricant, a mold releasing agent, a nucleating agent, a plasticizer, a flowability improving material, an antistatic agent, etc.

As the heat resistant stabilizer, any conventionally known material such as triphenylphosphine (P-Ph$_3$), etc., can be used.

As the antioxidant, tris(2,4-di-tert-butylphenyl)phosphite, n-octadecyl-β-(4'-hydroxy-3',5'-di-tert-butylphenyl)propionate, pentaerythrithyl-tetrakis[3-(3,5-di-tert-butyl-4-hydroxyphenyl)propionate], 1,6-hexanediolbis[3-(3,5-di-tert-butyl-4-hydroxyphenyl)propionate, triethylene glycol-bis-3-(3-tert-butyl-4-hydroxy-5-methylphenyl)propionate, 3,9-bis

[2-{3-(3-tert-butyl-4-hydroxy-5-methylphenyl)propionyloxy}-1,1-dimethylethyl]-2,4,8,10-tetraoxaspiro[5.5]undecane, triphenylphosphite, trisnonylphenylphosphite, tris-(2,4-di-tert-butylphenyl)phosphite, tetrakis(2,4-di-tert-butylphenyl)-4,4'-biphenylenediphosphonite, tricresylphosphite, 2,2-methylenebis(4,6-di-tert-butylphenyl)octylphosphite, etc., may be used. Of these, preferred are tris-(2,4-di-tertert-butylphenyl)phosphite and n-octadecyl-β-(4'-hydroxy-3',5'-di-tert-butylphenyl)propionate.

These additives can be mixed with the polycarbonate resin by any conventionally known method similarly to the catalyst deactivating agent. For example, a method of dispersing and mixing the respective components with a high-speed mixer represented by a turnbull mixer, a Henschel mixer, a ribbon blender, a super mixer, etc., followed by melting and kneading the mixture with an extruder, a Banbury mixer, a roll, etc., is appropriately selected. The step of adding the additives may be carried out simultaneously with or separately from the step of adding a catalyst deactivating agent.

According to the production process of the present embodiment, in the process for producing a high molecular weight aromatic polycarbonate resin by mixing the aromatic polycarbonate prepolymer and the catalyst composition containing the dialcohol compound and the first catalyst in a mixer in advance, and then, feeding the mixture to the molecular weight increasing linking reactor and subjecting to molecular weight increasing linking reaction, addition of the first catalyst to the dialcohol compound in advance permits stable feeding of the first catalyst with high accuracy and suppression of the amount of the heterogeneous structure that spontaneously generates and is inherent to the melting method. Accordingly, a high-quality high molecular weight polycarbonate resin having a low N value (structural viscosity index), good color hue, and extremely suppressed increase in heterogeneous structure can be produced by the melting method with good efficiency.

The process for producing the high molecular weight aromatic polycarbonate resin may be carried out batchwise or continuously. In the following, an example of a production process carried out in a continuous manner will be described in more detail with reference to the drawing, but the present invention is not limited thereto. In FIG. 1, the first step (a step of obtaining the catalyst composition) is referred to the linking agent preparing step, the third step is referred to the step carried out by mixer 6Mix, and the fourth step is referred to the linking polymerization step. In addition, the step of preparing the aromatic polycarbonate prepolymer (fifth step) is referred to the polycondensation step.

In an example of the continuous production process shown in FIG. 1, the high molecular weight aromatic polycarbonate resin is produced through the following steps:

at first, the main raw material preparing step of preparing an aromatic dihydroxy compound and a carbonic acid diester, which are main raw materials;

the polycondensation step (a step of preparing the aromatic polycarbonate prepolymer (fifth step), hereinafter also referred to as step (A)) of subjecting these raw materials to polycondensation reaction in a molten state, to form an aromatic polycarbonate prepolymer;

thereafter, subjecting the prepolymer to the step (third step, hereinafter also referred to as step (B)) of adding a catalyst composition, which has been obtained by mixing a dialcohol compound (a linking agent) and a catalyst in the linking agent preparing step (the first step), to the aromatic polycarbonate prepolymer, which has been obtained in step (A), to prepare a prepolymer mixture; and the step (fourth step, hereinafter also referred to as step (C)) of subjecting the prepolymer mixture obtained in step (B) to molecular weight increasing linking reaction under reduced pressure condition.

In FIG. 1, the catalyst composition obtained in the linking agent preparing step is transferred to mixer 6Mix, which is a prepolymer mixing tank, through transfer pipe 2La (second step).

Then, after conducting the steps of:

stopping the reaction, devolatilizing and removing unreacted raw materials, reaction by-products, etc., in the polymerization reaction liquid (not shown in the drawing);

adding a heat stabilizer, a releasing agent, a coloring agent, etc. (not shown in the drawing); and forming a high molecular weight aromatic polycarbonate resin into pellets having a predetermined particle size (not shown in the drawing);

pellets of the high molecular weight aromatic polycarbonate resin are molded.

The production process shown in FIG. 1 employs a multistage reaction step, and steps (A) and (C) are each carried out using different reactors. The polycondensation reactor for carrying out step (A) and the molecular weight increasing linking reactor (transesterification reactor) for carrying out step (C) are connected in series through the mixer for carrying out step (B). Preferably, the catalyst composition to be fed to step (B) is undergone dehydration treatment and/or devolatilization treatment after the dialcohol compound has been melted in another reactor and has been added to, mixed with or dispersed in the catalyst composition as an aqueous solution and/or an organic solution of a transesterification catalyst such as an alkali metal compound and/or an alkaline earth metal compound, etc.

The polycondensation reactor of step (A) may be composed of a single reactor or a plurality of reactors connected in series. Preferably two or more, preferably two to six reactors are connected in series.

On the other hand, the molecular weight increasing linking reactor of step (C) may composed of a single reactor or a plurality of reactors connected in series, and it is preferably composed of one reactor (a single reactor).

The reactor for preparing the catalyst composition to be fed to step (B) is preferably provided with two or more reactors for carrying out the reaction continuously.

In the main raw material preparing step, an aromatic dihydroxy compound and a carbonic acid diester, which are main raw materials, are prepared.

As an apparatus used in the main raw material preparing step, there are provided a raw material mixing tank (1Ra and 1Rb in FIG. 1) and a raw material feed pump (1P in FIG. 1) for feeding the prepared raw material to the polycondensation step. In raw material mixing tanks 1Ra and 1Rb, the aromatic dihydroxy compound and the carbonic acid diester, which are main raw materials, are continuously fed in a molten state from supply ports 1Ma and 1Mb under nitrogen gas atmosphere. In raw material mixing tanks 1Ra and 1Rb, the aromatic dihydroxy compound and the carbonic acid diester are mixed and melted at a predetermined molar ratio (preferably carbonic acid diester/aromatic dihydroxy compound=1.01 to 1.30 (molar ratio)) under nitrogen gas atmosphere to prepare a raw material-mixed melting liquid. The specifications of raw material mixing tanks 1Ra and 1Rb are not particularly limited, and conventionally known tanks can be used. For example, a tank provided with Max Blend stirring blades (1Ya and 1Yb in FIG. 1) can be used.

For continuous production, as shown in FIG. 1, it is preferable to provide two mixing tanks in the main raw material preparing step. By providing two mixing tanks, mixing and melting are alternately carried out, and valve 1Bp can be switched and continuously fed to reactor 3R.

As the polycondensation reactor for carrying out step (A), one or two or more reactors are used. When two or more reactors are used, they are connected in series. Preferably two or more reactors, more preferably 2 to 6 reactors, particularly preferably 3 to 5 reactors are connected in series and used. The polycondensation reactor may be either a vertical type or a horizontal type, and preferably a vertical type.

For example, in FIG. 1, as the polycondensation reactor of step (A), a first vertical stirring reactor 3R, a second vertical stirring reactor 4R, a third vertical stirring reactor 5R, and a fourth vertical stirring reactor 6R are provided.

In each of the polycondensation reactors, a stirring device such as any conventionally known stirring blade can be provided. Specific examples of the stirring blade include an anchor stirring blade, a Max Blend blade, a double helical ribbon blade, etc.

For example, in the first vertical stirring reactor 3R, the second vertical stirring reactor 4R, and the third vertical stirring reactor 5R in FIG. 1, Max Blend blades 3Y, 4Y, 5Y are provided and in the fourth vertical stirring reactor 6R, a double helical ribbon blade 6Y is provided, respectively.

In each of the reactors, a preheater, a gear pump, a distillation pipe for discharging by-products, etc., produced by the polycondensation reaction, a condenser such as a condenser, dry ice strap, etc., and a receiver of a recovery tank, etc., a decompression device for maintaining the predetermined depressurized state, etc., can be provided.

All the reactors used in the series of continuous production processes start to be adjusted so as to reach the inner temperature and the pressure within the preset range.

In the example of the continuous production process using the production apparatus shown in FIG. 1, at first, the five reactors connected in series (step (A); the first vertical stirring reactor 3R, the second vertical stirring reactor 4R, the third vertical stirring reactor 5R, the fourth vertical stirring reactor 6R, step (B); the mixer (6Mix), step (C); the fifth horizontal stirring reactor 7R) are previously adjusted to the inner temperature and pressure in comply with the respective reactions (melt polycondensation reaction and molecular weight increasing linking reaction).

For example, in the apparatus of FIG. 1, preheaters 3H, 4H, 5H and 6H, and gear pumps of 3P, 4P, 5P and 6P are provided. Also, to the four reactors, distillation pipes 3F, 4F, 5F and 6F are attached. Distillation pipes 3F, 4F, 5F and 6F are connected to condensers 3C, 4C, 5C and 6C, respectively, and the respective reactors are kept in a predetermined depressurized state by depressurizing devices 3V, 4V, 5V and 6V.

The reaction conditions in the polycondensation reactor are set so as to become high temperature, high vacuum, and low agitation speed as the polycondensation reaction proceeds. During the polycondensation reaction, the level of the liquid surface is controlled such that the average residence time in each reactor, for example, that in the reactor before the addition of the linking agent falls within the range of about 30 minutes to 120 minutes. Further, in each reactor, phenol produced concurrently with the melt polycondensation reaction is distilled out of the system by distillation pipes 3F, 4F, 5F and 6F attached to each reactor. The degree of reduced pressure in step (A) is preferably 0.0075 torr to 100 torr (1 Pa to 13.3 kPa), and the inner temperature of the reactor is preferably 140° C. to 300° C.

More specifically, in the method shown in FIG. 1, step (A) is carried out in four reactors (the first to the fourth vertical stirring reactors), and usually the following temperature and pressure are set. In the following, the conditions are also mentioned for the mixer of step (B) connected in series to the four reactors of step (A) and the molecular weight increasing linking reactor (the fifth horizontal stirring reactor) of step (C).

(Preheater 1H) 180° C. to 230° C.
(First Vertical Stirring Reactor 3R)
Inner temperature: 150° C. to 250° C., Pressure: 200 torr (26.6 kPa) to normal pressure, Temperature of heating medium 220° C. to 280° C.
(Preheater 3H) 200° C. to 250° C.
(Second Vertical Stirring Reactor 4R)
Inner temperature: 180° C. to 250° C., Pressure: 100 torr (13.3 kPa) to 200 torr (26.6 kPa), Temperature of heating medium 220° C. to 280° C.
(Preheater 4H) 230° C. to 270° C.
(Third Vertical Stirring Reactor 5R)
Inner temperature: 220° C. to 270° C., Pressure: 1 torr (133 Pa) to 100 torr (13.3 kPa), Temperature of heating medium 220° C. to 280° C.
(Preheater 5H) 230° C. to 270° C.
(Fourth Vertical Stirring Reactor 6R)
Inner temperature: 220° C. to 280° C., Pressure: 0.0075 torr (1 Pa) to 1 torr (133 Pa), Temperature of heating medium 220° C. to 300° C.
(Preheater 6H) 270° C. to 340° C.
(Mixer 6Mix)
Inner temperature: 220° C. to 300° C., Pressure: 200 torr (26.6 kPa) to 3,700 torr (0.5 MPa), Temperature of heating medium 220° C. to 320° C.
(Fifth Horizontal Stirring Reactor 7R)
Inner temperature: 260° C. to 340° C., Pressure: 10 torr or less (1,333 Pa or less), Temperature of heating medium 260° C. to 340° C.

Next, after the inner temperature and pressure of all the reactors used in the continuous production process of the present embodiment have reached within the range of −5% to +5% of the respective set values, and a raw material-mixed fused liquid prepared separately in raw material mixing tank 1R (1Ra and 1Rb) is continuously fed into the first vertical stirring reactor 3R through raw material feed pump 1P and preheater 1H. Also, simultaneously with the start of the feeding of the raw material-mixed fused liquid, the catalyst is continuously fed into the first vertical stirring reactor 3R from catalyst supply port 1Cat in the middle of the transfer piping of the raw material-mixed fused liquid, and then melt polycondensation based on the transesterification reaction is started.

The rotation number of the stirring blade of the reactor is not particularly limited, and preferably maintained at 10 rpm to 200 rpm. While distilling phenol by-produced with the progress of the reaction from the distillation pipe, the polycondensation reaction is carried out while maintaining the level of the liquid surface constant so as to keep the predetermined average residence time. The average residence time in each reactor is not particularly limited, and it is usually from 30 minutes to 120 minutes.

For example, in the production apparatus shown in FIG. 1, melt polycondensation is carried out in the first vertical stirring reactor 3R under nitrogen atmosphere, for example, at a temperature of 200° C. and a pressure of 200 torr (27 kPa) while maintaining the rotation number of Max Blend blade 3Y to 160 rpm. While distilling out the by-produced phenol from distillation pipe 3F, the level of the liquid surface is maintained constant so as to keep an average residence time of 60 minutes, and the polycondensation reaction is carried out.

Subsequently, the polymerization reaction liquid is discharged from the bottom of the tank of the first vertical stirring reactor 3R by gear pump 3P, and the liquid is fed through preheater 3H to the second vertical stirring reactor 4R, then through preheater 4H by gear pump 4P to the third vertical stirring reactor 5R, further through preheater 5H by gear pump 5P, and then to the fourth vertical stirring reactor 6R in sequence continuously, and the polycondensation reaction proceeds to produce the aromatic polycarbonate prepolymer.

The aromatic polycarbonate prepolymer obtained in the polycondensation reactor (in the case of using a plurality of reactors in step (A), the last one of the reactors) is fed to the mixer in step (B). On the other hand, the catalyst composition melted by the linking agent preparation apparatus, mixed with the catalyst solution, and undergone dehydration or devolatilization treatment under reduced pressure is directly fed (feeding liquid) from the linking agent feeding apparatus to the mixer. The aromatic polycarbonate prepolymer and the catalyst composition fed to the mixer are mixed in the mixer, and continuously fed to the molecular weight increasing linking reactor of step (C) as a prepolymer mixture.

For example, in the production apparatus shown in FIG. 1, the prepolymer discharged from the fourth vertical stirring reactor 6R is sequentially and continuously fed to mixer 6Mix by gear pump 6P through preheater 6H.

When the catalyst composition containing the catalyst and the dialcohol compound (linking agent) is fed to the mixer of step (B), the composition is prepared in a linking agent preparation tank, etc., prior to the feeding. For example, in the linking agent preparation apparatus (2Ra, 2Rb), the dialcohol compound is melted into a liquid state. At this time, the viscosity of the dialcohol compound is made preferably 0.1 P to 10,000 P (poise; 0.01 Pa·s to 1,000 Pa·s), and more preferably 1 P to 100 P (poise; 0.1 Pa·s to 10 Pa·s). By setting the viscosity of the dialcohol compound within this range, the dialcohol compound can be fed to the molecular weight increasing linking reactor stably and quantitatively, and the reaction of the dialcohol compound with the aromatic polycarbonate prepolymer can be carried out uniformly and rapidly. Further, a catalyst solution (aqueous solution and/or organic solution) is introduced from the catalyst solution introduction line (2Cata, 2Catb). By being stirred by the stirring blades (2Ya, 2Yb), the catalyst is mixed or dispersed, and water and/or an organic solvent is/are removed from the catalyst composition from the dehydration or devolatilization line (2Fa, 2Fb). The catalyst composition is preferably subjected to a dehydration treatment or devolatilization treatment in a molten state. In order to carry out dehydration in such a degree that it does not affect the molecular weight increasing linking reaction, the dehydration treatment or devolatilization treatment is carried out, for example, under reduced pressure at 300 torr (40 kPa) or less, preferably 100 torr (13.3 kPa) or less, more preferably 0.01 torr (1.3 Pa) or more and 100 torr (13.3 kPa) or less. Depending on the dialcohol compound, the temperature for the dehydration treatment may vary and the preferable temperature setting may differ, since the dialcohol compounds have a different melt viscosity. The treatment is carried out with the temperature range of not lower than the melting point of the dialcohol compound, preferably not lower than the melting point and not higher than the temperature 80° C. above the melting point, more preferably not lower than the melting point and not higher than the temperature 50° C. above the melting point. Although there is no particular limitation on the criteria of the dehydration treatment, the water content in the catalyst composition after the dehydration treatment is preferably 3% by mass or less, more preferably 1% by mass or less, further preferably 0.3% by mass or less, and particularly preferably 0.03% by mass or less. This operation permits more quantitative, stable feed of the catalyst composition.

In the case 2-butyl-2-ethyl-1,3-propane glycol (BEPG) is used as the dialcohol compound of the linking agent, for example, BEPG is melted at 75° C. to 80° C., since the melting point of BEPG is around 43° C., thereafter a predetermined amount of the catalyst aqueous solution is added thereto, and subjected to dehydration with stirring at 1 torr for about 30 minutes as a criterion.

The linking agent preparation apparatus (2Ra, 2Rb) are containers capable of heating to 50° C. to 200° C. The stirring blades (2Ya, 2Yb) provided in the linking agent preparation apparatus (2Ra, 2Rb) may be general stirring blades such as anchor blades, paddle blades, turbine blades, anchor stirring blades, Max Blend stirring blades, helical ribbon type stirring blades, lattice blades, etc., and also the shape is not limited as long as they can stir.

In the continuous production process, as shown in FIG. 1, it is preferable to provide two linking agent preparation apparatuses in the linking agent preparing step. By providing two linking agent preparation apparatuses, mixing and melting are alternately carried out, and valve 2Bp is switched so that the catalyst composition is continuously fed to mixer 6Mix through linking agent metering pump 2P and transfer pipe 2La.

The prepolymer mixture discharged from mixer 6Mix is continuously fed to the fifth horizontal stirring reactor 7R sequentially, and the molecular weight increasing linking reaction proceeds under the temperature and pressure conditions suitable for carrying out the molecular weight increasing linking reaction in the fifth horizontal stirring reactor 7R. The by-produced phenol and a part of unreacted monomers are removed to the outside of the system through vent conduit 7F.

For the apparatus such as feed line (transfer pipe) of the catalyst composition, valves and pumps, etc., a double tube or jacket type apparatus in which the catalyst composition flows in the inner tube and a heating medium flows in the outer tube, and further preferably equipments such as full jacket type valves and pumps, can be used to prevent solidification of the catalyst composition.

In step (C), the residence time (from the time of feeding the prepolymer mixture to the time of extracting the resulting high molecular weight polycarbonate resin) of the reaction mixture in the molecular weight increasing linking reactor cannot be specified unconditionally, because it tends to vary depending on the reaction apparatus (reactor) used; however, the residence time is preferably 60 minutes or shorter, more preferably 1 minute to 60 minutes, further preferably 5 minutes to 60 minutes, further more preferably 20 minutes to 60 minutes, still further preferably 25 minutes to 60 minutes, and particularly preferably 30 minutes to 60 minutes.

According to the production process of the present embodiment, the aromatic polycarbonate prepolymer and the catalyst composition are mixed in the mixer and then the mixture is continuously fed to a molecular weight increasing linking reactor to carry out the molecular weight increasing linking reaction, whereby the catalyst composition can be fed stably with high accuracy, and the amount of the heterogeneous structure spontaneously generates and is inherent to the melting method can be further suppressed. As a result, a high-quality high molecular weight polycarbonate resin having a low N value (structural viscosity index), good color hue, and extremely suppressed increase in heterogeneous structure can be produced by the melting method.

The reaction conditions in step (C) are set so as to ensure high interface renewal property by selecting a suitable polymerization apparatus and stirring blade at high temperature and high vacuum.

The reaction temperature in the molecular weight increasing linking reactor in step (C) falls, for example, within the range of 240° C. to 320° C., preferably 260° C. to 310° C., more preferably 280° C. to 310° C.; and the reaction pressure is 10 torr or less (1,333 Pa or less), preferably 2.0 torr or less (267 Pa or less), more preferably 0.01 torr to 1.5 torr (1.3 Pa to 200 Pa), and further preferably 0.01 torr to 1.0 torr (1.3 Pa to 133 Pa). Therefore, it is preferable to use a sealing mechanism including a mechanical seal for sealing the stirring shaft.

In step (C), the level of the liquid surface is desirably controlled so that the average residence time of the reaction mixture of the molecular weight increasing linking reaction be preferably 60 minutes or shorter, more preferably 1 minute to 60 minutes, further preferably 5 minutes to 60 minutes, further preferably 20 minutes to 60 minutes, further preferably 25 minutes to 60 minutes, particularly preferably 30 minutes to 60 minutes. In the reactor, the by-produced phenol is distilled from the distillation pipe.

In the production apparatus shown in FIG. 1, by-products such as phenol, etc., are continuously liquefied and recovered from condensers 3C and 4C attached to the first vertical stirring reactor 3R and the second vertical stirring reactor 4R, respectively. Each of condensers 3C and 4C is divided into two or more sub-condensers, and a part or all of the distillate condensed in the sub-condenser that is the nearest to the reactor is recirculated to the first vertical stirring reactor 3R and the second vertical stirring reactor 4R, thereby the raw material molar ratio can be easily controlled, so that such a manner is preferred. Also, by-products are continuously solidified and recovered by a cold trap (not shown in the drawing) provided on the downstream side of condensers 5C, 6C and 7C attached to the third vertical stirring reactor 5R, the fourth vertical stirring reactor 6R and the fifth horizontal stirring reactor 7R, respectively.

The recovered by-products may pass through such steps as hydrolysis, purification, etc. and reused (recycled). The major by-products include the aromatic monohydroxyl compounds such as phenol, etc., unreacted dialcohol compounds and cyclic carbonates derived from the dialcohol compounds, etc. In particular, phenol can be reused by recovering and feeding to the diphenyl carbonate production step. Also, when a cyclic carbonate derived from the dialcohol compound is by-produced, the cyclic carbonate can be recovered and reused in the same manner.

In this manner, in the continuous production apparatus shown in FIG. 1, after the inner temperature and pressure of the five reactors have reached the predetermined values, the molten liquid of mixed raw materials and the catalyst are continuously fed through the preheater, and melt polycondensation based on transesterification is initiated. Therefore, from immediately after the start of the melt polycondensation, the polymerization reaction liquid in each reactor reaches an average residence time equal to that during steady operation. Further, because the molecular weight of prepolymers is increased within a short period of time by binding low molecular weight prepolymers to each other using a dialcohol compound having a fast transesterification rate, the polymer does not suffer from unnecessary thermal history and unlikely to undergo branching. In addition, the quality such as color hue, etc., becomes good.

EXAMPLES

In the following, the present invention will be specifically explained with reference to Examples, but the present invention is not limited to these Examples.

Measurement of the physical property values in Examples were carried out as follows.

(1) Weight Average Molecular Weight:

It is a value measured by gel permeation chromatography (GPC), and is a weight average molecular weight in terms of polystyrene calculated from a calibration curve of standard polystyrene prepared beforehand.

First, a calibration curve was prepared using standard polystyrene ("PStQuick MP-M" manufactured by Tosoh Corporation) of known molecular weight (molecular weight distribution=1). The elution time and molecular weight value of each peak were plotted from the measured standard polystyrenes, and approximated by a cubic equation to obtain a calibration curve. The weight average molecular weight (Mw) was obtained from the following calculation equation.

$$Mw = \Sigma(W_i \times M_i) \div \Sigma(W_i)$$

Here, i represents the i-th dividing point when dividing the molecular weight M, $W_i$ represents the i-th weight, and $M_i$ represents the i-th molecular weight. Also, the molecular weight M represents the polystyrene molecular weight value at the same elution time in the calibration curve.

[Measurement Conditions]

Apparatus; HLC-8320GPC manufactured by Tosoh Corporation
Column; Guard column: TSKguardcolumn SuperMPHZ-M×1
Analytical column: TSKgel SuperMultiporeHZ-M×3
Solvent; HPLC grade chloroform
Injection amount; 10 μL
Sample concentration; 0.2 w/v % HPLC grade chloroform solution
Solvent flow rate; 0.35 ml/min
Measurement temperature; 40° C.
Detector; RI (2) Amount of Terminal Phenyl Group and Concentration of Terminal Phenyl Group:

0.05 g of a resin sample was dissolved in 1 ml of deuterated chloroform (containing 0.05 w/v % TMS), $^1$H-NMR spectrum was measured at 23° C. using a nuclear magnetic resonance analyzer under the following conditions, and the amount of the terminal phenyl group of the prepolymer (PP) was calculated.

[Measurement Conditions]

Apparatus: JEOL LA-500 (500 MHz), JEOL LTD.
Measurement nucleus: $^1$H
Relaxation delay: 1 s
x_angle: 45 deg
x_90_width: 20 μs
x_plus: 10 μs
Scan: 500 times

[Calculation Method]

From the integral ratio of the terminal phenyl group around 7.4 ppm and the phenylene group (derived from the BPA skeleton) around 7.0 ppm to 7.3 ppm, the amount of the terminal phenyl group of PP and the concentration of the terminal phenyl group were determined.

(3) Concentration of Terminal Hydroxyl Group:

0.05 g of the resin sample was dissolved in 1 ml of deuterated chloroform (containing 0.05 w/v % TMS), $^1$H-NMR was measured at 23° C. under the same conditions as above using a nuclear magnetic resonance analyzer, and the concentrations of the terminal hydroxyl group (OH concentration) in the prepolymer (PP) and in the high molecular weight polycarbonate (PC) were measured.

[Calculation]

From the integral ratio of the peak of the hydroxyl group around 4.7 ppm to that of phenyl and phenylene groups (terminal phenyl group and phenylene group derived from the BPA skeleton) around 7.0 ppm to 7.5 ppm, the concentrations of the terminal hydroxyl group (OH concentration) of PP and of the high molecular weight PC were calculated.

(4) N Value (Structural Viscosity Index):

It was calculated by the following numerical equation.

$$N \text{ value} = (\log(Q160 \text{ value}) - \log(Q10 \text{ value}))/(\log 160 - \log 10) \quad (I)$$

The Q160 value is a melt flow volume per unit time (ml/sec) measured at 280° C. under a load of 160 kg, and it is measured using Type CFT-500D manufactured by Shimadzu Corporation, and calculated from stroke=7.0 mm to 10.0 mm. Note that nozzle diameter 1 mm×nozzle length 10 mm was used.

The Q10 value is a melt flow volume per unit time (ml/sec) measured at 280° C. under a load of 10 kg, and it is measured using Type CFT-500D manufactured by Shimadzu Corporation, and calculated from stroke=7.0 mm to 10.0 mm. Note that nozzle diameter 1 mm×nozzle length 10 mm was used.

(5) YI Value (Yellowness Degree):

It means the degree in which the color hue leaves from colorless or white color to the direction of yellow. 6 g of a resin sample were dissolved in 60 ml of methylene chloride and the solution was subjected to a measurement in accordance with the standard of JIS K7105 using a spectral color difference meter (SE2000 manufactured by Nippon Denshoku Industries Co., Ltd.).

(6) Amount of Heterogeneous Structure:

0.05 g of a resin sample was dissolved in 1 ml of deuterated chloroform (containing 0.05 w/v % TMS), and the amount of the heterogeneous structure in the high molecular weight polycarbonate (PC) was determined using $^1$H-NMR data measured at 23° C. under the same conditions as above with a nuclear magnetic resonance analyzer. Specifically, the amount of heterogeneous structure (PSA) was determined from the ratio of presence of Ha and Hb based on the assignment of $^1$H-NMR described in P. 7659 in the literature Polymer 42 (2001) 7653-7661 as follows.

[Formula 12]

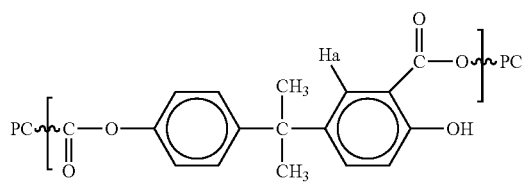

-continued

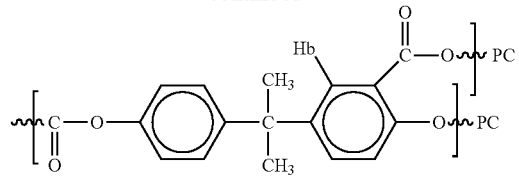

[Calculation]

From the integral ratios of the signals of Ha (around 8.01 ppm) and Hb (around 8.15 ppm) in the above-mentioned heterogeneous structure unit to the signals of phenyl and phenylene group (terminal phenyl group and phenylene group derived from the BPA skeleton) around 7.0 ppm to 7.5 ppm, the amount of the heterogeneous structure was calculated.

Example 1

A polycarbonate resin was produced by the following conditions using continuous production apparatus having two main raw material preparation tanks (1Ra, 1Rb), two linking agent preparation tanks (2Ra, 2Rb), four vertical stirring reactors (3R to 6R) and one horizontal stirring reactor (7R) shown in FIG. 1.

First, each reactor and each preheater were previously set to an inner temperature and pressure in accordance with the following reaction conditions.

(Preheater 1H) 225° C.

(First Vertical Stirring Reactor 3R) Inner temperature: 215° C., Pressure: 200 torr (26.6 kPa), Temperature of heating medium 245° C.

(Preheater 3H) 235° C.

(Second Vertical Stirring Reactor 4R)

Inner temperature: 225° C., Pressure: 150 torr (20 kPa), Temperature of heating medium 255° C.

(Preheater 4H) 245° C.

(Third Vertical Stirring Reactor 5R)

Inner temperature: 235° C., Pressure: 100 torr (13.3 kPa), Temperature of heating medium 265° C.

(Preheater 5H) 270° C.

(Fourth Vertical Stirring Reactor 6R)

Inner temperature: 260° C., Pressure: 0.1 torr (13.3 Pa), Temperature of heating medium 280° C.

Under nitrogen gas atmosphere, a melted mixture prepared by mixing diphenyl carbonate and BPA as occasion demands so as to have a raw material molar ratio (diphenyl carbonate/bisphenol A (BPA)) of 1.125 in main raw material preparation tanks 1Ra and 1Rb was fed continuously to the first vertical stirring polymerization tank 3R at a flow rate of 24 kg/hr, and a level of the liquid surface was kept constant while controlling the degree of opening of the valve provided in the polymer discharge line at the bottom of the tank so that the average residence time in the first vertical stirring polymerization tank 3R be 60 minutes. At this time, 0.005 mol/L of an aqueous cesium carbonate ($Cs_2CO_3$) solution was added as a catalyst from 1Cat in a ratio of $0.25 \times 10^{-6}$ mol (2.6 ml/hr) based on 1 mol of BPA.

The polymerization reaction solution discharged from the bottom of the first vertical stirring reactor 3R is continuously fed to the second vertical stirring reactor 4R, the third vertical stirring reactor 5R, the fourth vertical stirring reactor 6R and the mixer 6Mix subsequently.

At the same time, 1,000 g of a dialcohol compound (2-butyl-2-ethyl-1,3-propane glycol; BEPG; the melting point 43° C.) was charged in catalyst composition preparation tanks (2Ra, 2Rb) equipped with anchor blades, and then nitrogen substitution therein was carried out where appropriate. The content in the tank was heated and melted at 75° C. to 80° C., and thereto was added 20 ml of an aqueous cesium carbonate ($Cs_2CO_3$) solution having a concentration of 0.005 mol/L as a catalyst. Thereafter, dehydration treatment (final water content: 0.03% by mass) was carried out at 0.1 torr (13.3 Pa), to prepare a catalyst composition.

Figure 2:
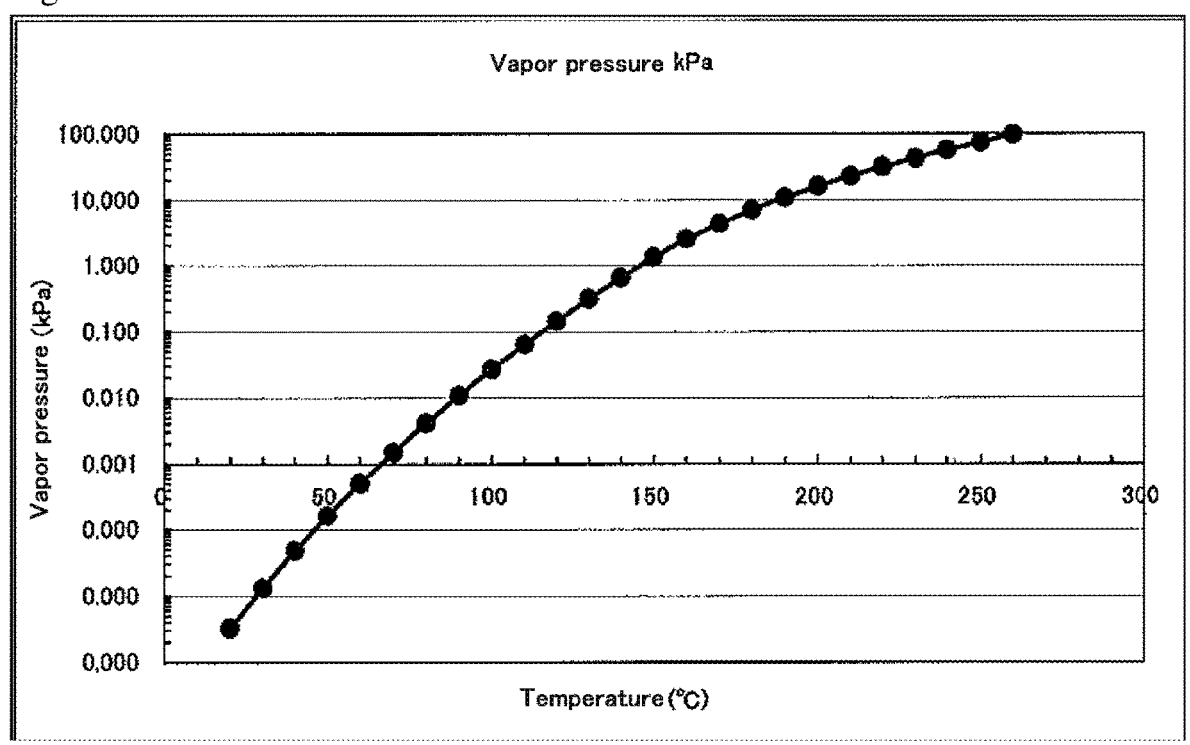
FIG. 2 is a vapor pressure curve of BEPG.

The melting point of BEPG is 43° C., and its vapor pressure curve is shown in FIG. 2. The vapor pressure of BEPG at 280° C. to 300° C. is 130 kPa to 220 kPa.

To the prepolymer mixing tank (mixer 6Mix), the prepolymer (PP) was fed with a flow rate of 13,200 g/hr, and simultaneously, the catalyst composition having a melt viscosity of 40 P (poise) prepared as above was continuously fed thereto from the catalyst composition preparation tanks (2Ra and 2Rb) at a flow rate of 120 g/hr (0.25 mol with respect to 1 mol of the total amount of PP (amount of terminal blocking phenyl group)) through the transfer pipe by a metering pump. At this time, the catalyst was added in a ratio of $0.25 \times 10^{-6}$ mol based on 1 mol of BPA constituting the prepolymer. The temperature of preheater 6H was 290° C., the temperature of mixer 6Mix was 280° C. to 300° C., the pressure was 760 torr (0.10 MPa), and the temperature of heating medium was 280° C. to 300° C.

The transfer pipe had a double tube structure, and a heating medium for temperature control circulated in the outer tube. The temperature of the heating medium was controlled to 100° C. to 200° C.

In addition, the catalyst composition preparation tank had a catalyst composition extraction port, and the catalyst composition extraction port was arranged above the prepolymer mixing tank connected through the transfer pipe. The transfer pipe and the prepolymer mixing tank (mixer 6Mix) were connected through a flange.

The weight average molecular weight (Mw) of PP continuously fed to the prepolymer mixing tank (6Mix) in terms of polystyrene was 30,000, the concentration of the terminal phenyl group was 6.0 mol %, and the concentration of the terminal hydroxyl group was 200 ppm.

To the fifth horizontal stirring reactor 7R, the PP mixture was supplied from mixer 6Mix with a flow rate of 13,200 g/hr. The internal pressure of the fifth horizontal stirring reactor 7R at this time was set to reduced pressure conditions of 0.5 torr (66.7 Pa), but the degree of pressure reduction was the set pressure as it was, and steady and stable operation was possible. In addition, the temperature of the heating medium was controlled at 300° C. to 320° C.

During the polymerization reaction (molecular weight increasing reaction), the level of the liquid surface was controlled so that the average residence time in each vertical reactor was 60 minutes and the average residence time of the fifth horizontal stirring reactor 7R was 60 minutes, and removal of phenol, which was by-produced simultaneously with the polymerization reaction, was carried out. Stirring blade 7Y of fifth horizontal stirring reactor 7R was stirred at 20 rpm.

The obtained prepolymer mixture after mixing with mixer 6Mix had a concentration of the terminal hydroxyl group of 200 ppm, and a weight average molecular weight (Mw) in terms of polystyrene of 26,500.

The polycarbonate resin obtained after carrying out the molecular weight increasing linking reaction in the fifth horizontal stirring reactor 7R had a weight average molecular weight (Mw) in terms of polystyrene of 56,000. In addition, it had a concentration of the terminal hydroxyl group of 800 ppm, a N value of 1.23, a YI value of 1.5, and an amount of the heterogeneous structure (PSA) of 700 ppm.

The reactors used in Example 1 were as follows.
First to Fourth vertical stirring reactors
  Manufacturer; Sumitomo Heavy Industries, Ltd.
  Material; SUS316L electropolished
  Stirring blade; First to Third vertical stirring reactors were Max Blend blades
  Fourth vertical stirring reactor was double helical ribbon blades Catalyst composition preparation tank
  Material; SUS316
Mixer (in-line mixer; prepolymer mixing tank)
  S1KRC reactor manufactured by Kurimoto Ltd.
  Size; L/D=10.2, Body effective volume=0.12 L
Liquid feeding pump for catalyst composition
  Continuous non-pulsatile metering pump manufactured by Fuji Techno Industries Corporation
Transfer pipe
  Material: SUS316
  Structure: double tube
Fifth horizontal stirring reactor
  Manufacturer; Hitachi, Ltd.
  Equipment type; Spectacle blade, polymerizer effective volume=13 L
  Material; SUS316L electropolished
  Extracting machine; screw type drawing machine
  Method for adjusting oxygen concentration in reactor; Pressurized, devolatilized and replaced with nitrogen The residence time of the reaction mixture was an average residence time of the reaction mixture from the supply port of the aromatic polycarbonate prepolymer of the horizontal stirring reactor to the outlet of the high molecular weight polycarbonate resin produced.

Example 2

A high molecular weight aromatic polycarbonate was produced in the same manner as in Example 1 except that the dialcohol compound was changed to bisphenoxyethanol fluorene (BPEF), that the control temperature of the catalyst composition preparation tank was changed to 200° C. to 210° C., that the continuous feeding was carried out with a flow amount of 240 g/hr (total terminal amount of PP (amount of terminal blocking phenyl group: 0.25 mol per 1 mol) from the catalyst composition preparation tanks (2Ra, 2Rb) by a metering pump, that the temperature of the heating medium in the outer tube of the transfer pipe for transferring the catalyst composition was controlled within the range of 200° C. to 250° C., and that the pressure of prepolymer mixing tank (6Mix) was set at 0.0001 MPa.

The vapor pressure of BPEF at 320° C. is less than 100 Pa.

Example 3

The set pressure of the prepolymer mixing tank (6Mix) was changed to 5 MPa. A high molecular weight aromatic polycarbonate was produced in the same conditions as in Example 1 except for the set pressure of the prepolymer mixing tank (6Mix).

Example 4

The temperature of the heating medium in the outer tube of the transfer pipe of the catalyst composition was set at 55° C. to 65° C. A high molecular weight aromatic polycarbonate was produced in the same conditions as in Example 1 except for the setting of the temperature of the heating medium in the outer tube of the transfer pipe.

Example 5

The temperature of the heating medium in the outer tube of the transfer pipe of the catalyst composition was set at 140° C. to 150° C. A high molecular weight aromatic polycarbonate was produced in the same conditions as in Example 1 except for the setting of the temperature of the heating medium in the outer tube of the transfer pipe.

Example 6

The temperature of the prepolymer mixing tank (6Mix) was set at 240° C. to 260° C. A high molecular weight aromatic polycarbonate was produced in the same conditions as in Example 5 except for the set temperature of the prepolymer mixing tank (6Mix).

Comparative Example 1

The temperature of the heating medium in the outer tube of the transfer pipe of the catalyst composition was controlled at 140° C. to 150° C. A high molecular weight aromatic polycarbonate was produced in the same conditions as in Example 1 except, in addition to the above, that the set pressure of the prepolymer mixing tank (6Mix) was changed to 10 MPa, that the temperature of the prepolymer mixing tank (6Mix) was set to 280° C. to 300° C., and that the temperature of the heating medium of the fifth horizontal stirring reactor was set to 300° C. to 320° C.

Comparative Example 2

A high molecular weight aromatic polycarbonate was produced in the same conditions as in Comparative example 1 except that the temperature of the heating medium in the outer tube of the transfer pipe of the catalyst composition was controlled at 40° C. to 45° C., and that the set pressure of the prepolymer mixing tank (6Mix) was 6 MPa,.

Comparative Example 3

A high molecular weight aromatic polycarbonate was produced in the same conditions as in Comparative example 2 except that the temperature of the heating medium in the outer tube of the transfer pipe of the catalyst composition was controlled at 300° C. to 310° C., and that the set pressure of the prepolymer mixing tank (6Mix) was 6 MPa.

The above results are summarized in the following Table.

INDUSTIRAL APPLICABILITY

The production process of the present invention permits economically advantageous production of a high molecular weight aromatic polycarbonate resin having a good color hue, a sufficiently high molecular weight, a low N value (structural viscosity index) and excellent quality in flowability, by a process for producing a high molecular weight aromatic polycarbonate resin comprising reacting an aromatic polycarbonate prepolymer with a dialcohol compound to carry out a molecular weight increasing linking reaction. In addition, in the resulting high molecular weight aromatic polycarbonate resin, occurrence of heterogeneous structure has effectively been suppressed.

REFERENCE SIGNS LIST

1Ra, 1Rb: Raw material mixing tank, 2Ra, 2Rb: linking agent preparation apparatus, 3R: First vertical stirring reactor, 4R: Second vertical stirring reactor, 5R: Third vertical stirring reactor, 6R: Fourth vertical stirring reactor, 6Mix: Mixer, 7R: Fifth horizontal stirring reactor.

The invention claimed is:
1. A process for producing a high molecular weight aromatic polycarbonate resin which comprises:
  mixing a dialcohol compound represented by formula (1) and a catalyst to obtain a catalyst composition, wherein the dialcohol compound contains an aromatic ring,
  transferring the obtained catalyst composition to a prepolymer mixing tank through a transfer pipe, wherein the transfer pipe has a double tube structure including an inner tube and an outer tube, the catalyst composition flows in the inner tube and a heating medium flows in the outer tube,
  mixing the transferred catalyst composition and an aromatic polycarbonate prepolymer in the prepolymer mixing tank under a pressure of not lower than a vapor pressure of the dialcohol compound at a temperature of the prepolymer mixing tank and not higher than 5 MPa, to obtain a prepolymer mixture, and
  increasing a molecular weight of the prepolymer by subjecting the obtained prepolymer mixture to heat

TABLE 1

|  | Example 1 | Example 2 | Example 3 | Example 4 | Example 5 | Example 6 | Comparative example 1 | Comparative example 2 | Comparative example 3 |
|---|---|---|---|---|---|---|---|---|---|
| Catalyst composition | $Cs_2CO_3$/BEPG | $Cs_2CO_3$/BPEF | $Cs_2CO_3$/BEPG | $Cs_2CO_3$/BEPG | $Cs_2CO_3$/BEPG | $Cs_2CO_3$/BEPG | $Cs_2CO_3$/BEPG | $Cs_2CO_3$/BEPG | $Cs_2CO_3$/BEPG |
| Catalyst composition flow rate (g/hr) | 120 | 240 | 120 | 120 | 120 | 120 | 120 | 120 | 120 |
| Transfer tube temperature (° C.) | 100-200 | 200-250 | 100-200 | 55-65 | 140-150 | 140-150 | 140-150 | 40-45 | 300-310 |
| Prepolymer mixing tank set pressure (MPa) | 0.1 | 0.0001 | 5 | 0.1 | 0.1 | 0.1 | 10 | 6 | 6 |
| Prepolymer mixing tank controlled temperature (° C.) | 280-300 | 280-300 | 280-300 | 280-300 | 280-300 | 240-260 | 280-300 | 280-300 | 280-300 |
| Fifth horizontal polymerization reactor controlled temperature (° C.) | 300-320 | 300-320 | 300-320 | 300-320 | 300-320 | 300-320 | 300-320 | 300-320 | 300-320 |
| M w | 56,000 | 59,000 | 55,000 | 57,000 | 56,000 | 62,000 | 34,000 | 32,000 | 33,000 |
| OH concentration (ppm) | 800 | 900 | 700 | 700 | 700 | 320 | 800 | 600 | 700 |
| N value | 1.23 | 1.23 | 1.23 | 1.22 | 1.22 | 1.18 | 1.21 | 1.33 | 1.28 |
| YI value | 1.5 | 1.6 | 1.8 | 1.5 | 1.6 | 1.1 | 1.8 | 2.1 | 1.9 |
| Heterogeneous structure (PSA) amount (ppm) | 700 | 500 | 600 | 560 | 560 | 450 | 1.200 | 1.500 | 1.300 | treatment under a reduced pressure to obtain a high molecular weight aromatic polycarbonate resin:

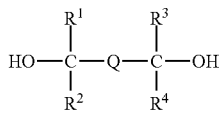
(1)

wherein, in formula (1), $R^1$ to $R^4$ each independently represents a hydrogen atom, a halogen atom, or a linear or branched alkyl group having 1 to 5 carbon atoms; and Q represents a single bond or a substituted or unsubstituted divalent group comprising at least one member selected from the group consisting of an aliphatic group, an aromatic group, an oxygen atom, a sulfur atom, a sulfone group, a sulfoxide group, a carbonyl group, a dialkylsilyl group, and a diarylsilyl group.

2. The process according to claim 1, wherein the catalyst composition is transferred to the prepolymer mixing tank in a temperature range of not lower than a temperature 5° C. above a melting point of the dialcohol compound and not higher than a temperature 250° C. above the melting point of the dialcohol compound.

3. The process according to claim 1 or 2, wherein the prepolymer mixture is obtained at a temperature not lower than a temperature at which the catalyst composition is transferred.

4. The process according to claim 1 or 2, wherein the prepolymer mixture is obtained at a temperature of not higher than a temperature 260° C. above the melting point of the dialcohol compound.

5. The process according to claim 1 or 2, wherein the high molecular weight aromatic polycarbonate resin is obtained at a temperature of not lower than the temperature of the prepolymer mixing tank.

6. The process according to claim 1 or 2, wherein the high molecular weight aromatic polycarbonate resin is obtained at a temperature of not higher than a temperature 80° C. above the temperature of the prepolymer mixing tank.

7. The process according to claim 1 or 2, wherein the catalyst is at least one member selected from the group consisting of an alkali metal salt and an alkaline earth metal salt.

8. The process according to claim 1 or 2, wherein the heating medium that flows in the outer tube of the transfer pipe is controlled to have a temperature of 200° C. to 250° C.

9. The process according to claim 1 or 2, wherein the dialcohol compound is selected from the group consisting of 9,9-bis[4-(2-hydroxyethoxy)phenyl]fluorene (BPEF), 9,9-bis(hydroxymethyl)fluorene, 9,9-bis(hydroxyethyl)fluorene, fluorene glycol, and fluorene dimethanol.

10. The process according to claim 9, wherein the dialcohol compound is 9,9-bis[4-(2-hydroxyethoxy)phenyl]fluorene (BPEF).

* * * * *